(12) United States Patent
Perdew et al.

(10) Patent No.: US 11,743,165 B2
(45) Date of Patent: *Aug. 29, 2023

(54) COGNITIVE HETEROGENEOUS AD HOC MESH NETWORK

(71) Applicant: Quixotic Holdings, LLC, Fife, WA (US)

(72) Inventors: Matthew David Perdew, Anchorage, AK (US); Ryan Scott Luther, Lakeland, FL (US)

(73) Assignee: QUIXOTIC HOLDINGS, LLC, Fife, WA (US)

( * ) Notice: Subject to any disclaimer, the term of this patent is extended or adjusted under 35 U.S.C. 154(b) by 202 days.

This patent is subject to a terminal disclaimer.

(21) Appl. No.: 17/246,273

(22) Filed: Apr. 30, 2021

(65) Prior Publication Data

US 2021/0258734 A1    Aug. 19, 2021

Related U.S. Application Data

(63) Continuation of application No. 16/522,525, filed on Jul. 25, 2019, now Pat. No. 11,012,817, which is a
(Continued)

(51) Int. Cl.
*H04L 45/02* (2022.01)
*H04W 4/02* (2018.01)
*H04W 84/18* (2009.01)
*H04W 4/029* (2018.01)
*H04B 7/185* (2006.01)
(Continued)

(52) U.S. Cl.
CPC ............. *H04L 45/02* (2013.01); *H04W 4/027* (2013.01); *H04B 7/18504* (2013.01); *H04B 7/18506* (2013.01); *H04W 4/023* (2013.01); *H04W 4/029* (2018.02); *H04W 4/06* (2013.01);
(Continued)

(58) Field of Classification Search
CPC .............................. H04L 45/02; H04W 4/027
See application file for complete search history.

(56) References Cited

U.S. PATENT DOCUMENTS

| 8,971,274 B1 | 3/2015 | Teller et al. |
| 9,325,793 B1 | 4/2016 | Stone et al. |

(Continued)

*Primary Examiner* — Kevin C. Harper
(74) *Attorney, Agent, or Firm* — Seed IP Law Group LLP

(57) ABSTRACT

Embodiments described herein are directed to creating a cognitive heterogeneous ad hoc mesh network via generation and utilization of a participant table. Participant object transmit notification signals to inform other participants objects in line-of-sight of their position and movement. Mobile participants that receive these notification signals update a local version of the participant table. If the receiving mobile participant is responsible for forwarding participant table updates to the sending mobile participant, then the receiving mobile participant includes the received notification signal with the transmission of its next notification signal to propagate the participant table update to a stationary participant. The stationary participant can then transmit participant table updates to other mobile participants. If a stationary participant is not accessible or not functioning, the participants continue to propagate participant table changes when a responsible forwarding participant changes.

20 Claims, 16 Drawing Sheets

Related U.S. Application Data continuation of application No. 15/913,612, filed on Mar. 6, 2018, now Pat. No. 10,419,103.

(60) Provisional application No. 62/467,572, filed on Mar. 6, 2017.

(51) Int. Cl.
| | |
|---|---|
| *H04W 40/22* | (2009.01) |
| *H04W 84/12* | (2009.01) |
| *H04W 4/06* | (2009.01) |
| *H04W 4/40* | (2018.01) |

(52) U.S. Cl.
CPC .............. *H04W 4/40* (2018.02); *H04W 40/22* (2013.01); *H04W 84/12* (2013.01); *H04W 84/18* (2013.01)

(56) References Cited

U.S. PATENT DOCUMENTS

| | | |
|---|---|---|
| 9,792,129 B2 | 10/2017 | Alicot et al. |
| 9,973,261 B1 | 5/2018 | Hardy et al. |
| 10,178,509 B1 | 1/2019 | Perdew et al. |
| 10,419,103 B1 | 9/2019 | Perdew et al. |
| 2005/0288031 A1 | 12/2005 | Davis et al. |
| 2007/0280192 A1* | 12/2007 | Yagyu .................... H04L 45/48 |
| | | 370/349 |
| 2010/0281100 A1 | 11/2010 | Benco et al. |
| 2018/0316603 A1 | 11/2018 | Boucadair et al. |

* cited by examiner

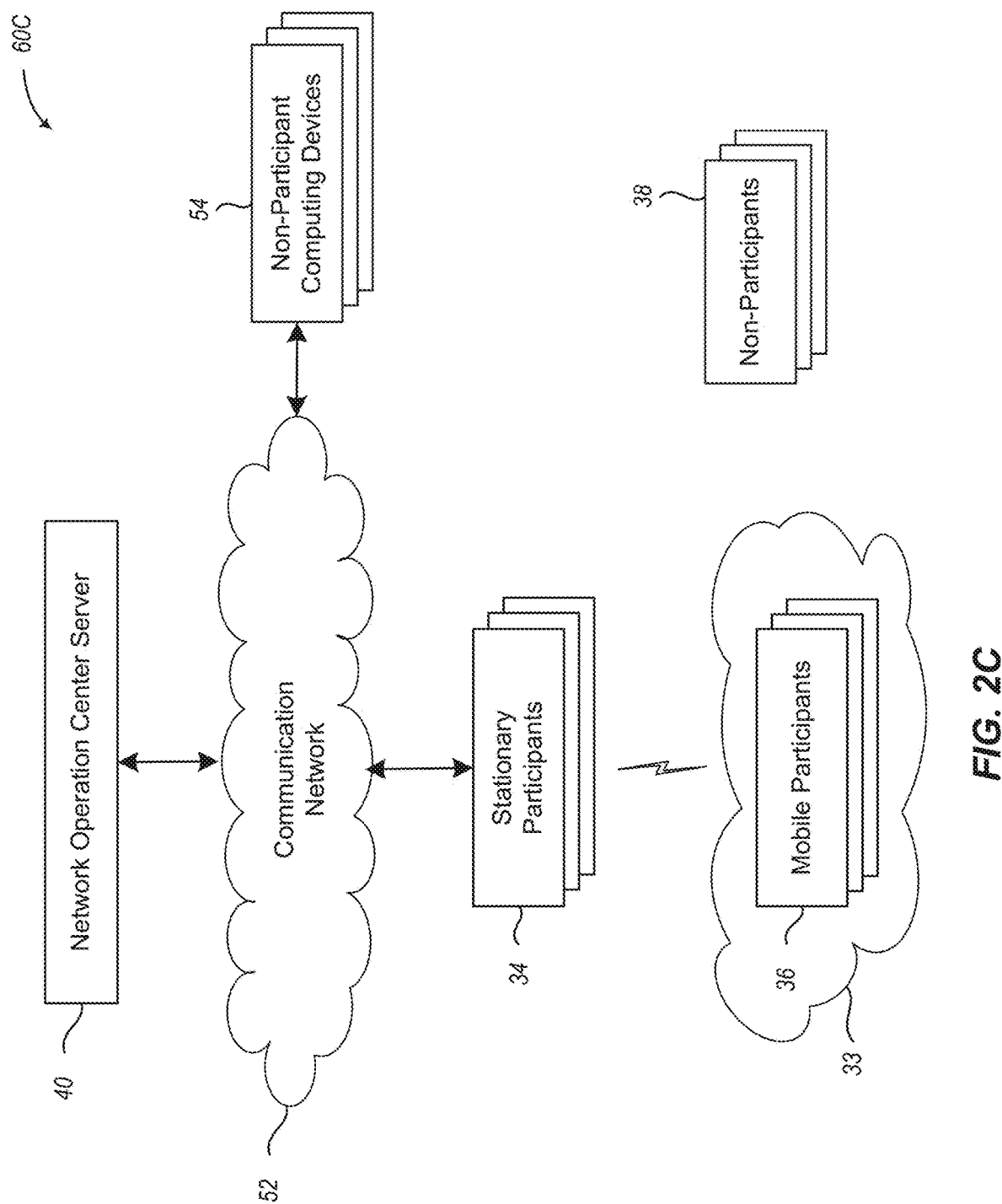

COGNITIVE HETEROGENEOUS AD HOC MESH NETWORK

BACKGROUND

Technical Field

The present disclosure relates generally to information distribution networks and, more particularly, to utilizing mobile and stationary communication devices to create a multi-layered mesh network for safety and data transmission.

Description of the Related Art

Mobile communication devices have become a very integral part in many people's lives, and the number of mobile communication devices in use continues to grow. Today, mobile communication devices are very powerful computers that are connected via various different networks, data paths, and protocols. Yet most mobile communication devices rely on stationary cellular or wireless access points or satellite transmissions to connect to a particular network, which can limit access, increase latency, or decrease bandwidth based on the network layout, the number of users on a particular network, a user's location, and other factors.

Similarly, reliance on mobile communication devices has expanded the need to be connected to the Internet in ever expanding locations. For example, people can now use mobile communication devices on commercial airlines to watch movies, play games, or check their email or social media platforms. Many commercial airlines rely on satellite communication networks to provide its passengers with Internet access. However, these communication networks are often slow and have limited bandwidth capabilities. It is with respect to these and other considerations that the following disclosure addresses.

BRIEF SUMMARY

Briefly stated, embodiments described herein are directed to creating a cognitive heterogeneous ad hoc mesh network via generation and utilization of a participant table. Participant objects transmit notification signals to inform other participants objects in line-of-sight of their position and movement. Mobile participants that receive these notification signals update a local version of the participant table. If the receiving mobile participant is responsible for forwarding participant table updates to the sending mobile participant, then the receiving mobile participant includes the received notification signal with the transmission of its next notification signal to propagate the participant table update to a stationary participant. The stationary participant can then transmit participant table updates to other mobile participants. If a stationary participant is not accessible or not functioning, the participants continue to propagate participant table changes when a responsible forwarding participant changes. One benefit of embodiments described herein is a dynamically changing ad hoc mesh network that can transmit communications to various devices and across platforms without a complex cellular network.

BRIEF DESCRIPTION OF THE SEVERAL VIEWS OF THE DRAWINGS

Non-limiting and non-exhaustive embodiments are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings:

FIGS. 2A-2C illustrate block diagrams of the different layers of the cognitive heterogeneous ad hoc mesh network in accordance with embodiments described herein;

DETAILED DESCRIPTION

Figure 1A:
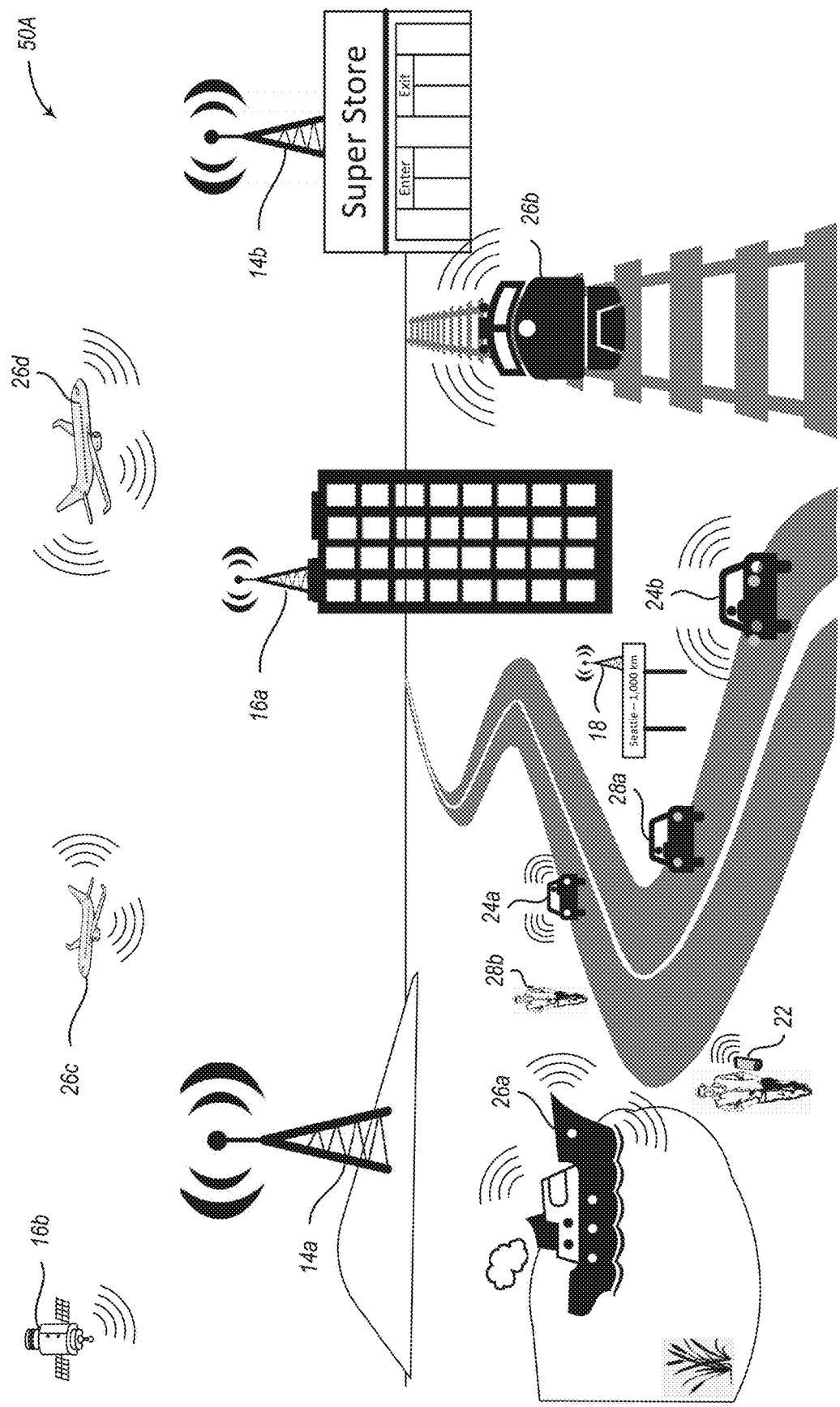
FIGS. 1A-1B illustrate context diagrams of an environment for establishing a cognitive heterogeneous ad hoc mesh network in accordance with embodiments described herein.

The following description, along with the accompanying drawings, sets forth certain specific details in order to provide a thorough understanding of various disclosed embodiments. However, one skilled in the relevant art will recognize that the disclosed embodiments may be practiced in various combinations, without one or more of these specific details, or with other methods, components, devices, materials, etc. In other instances, well-known structures or components that are associated with the environment of the present disclosure, including but not limited to the communication systems and networks, have not been shown or described in order to avoid unnecessarily obscuring descriptions of the embodiments. Additionally, the various embodiments may be methods, systems, media, or devices. Accordingly, the various embodiments may be entirely hardware embodiments, entirely software embodiments, or embodiments combining software and hardware aspects.

Throughout the specification, claims, and drawings, the following terms take the meaning explicitly associated herein, unless the context clearly dictates otherwise. The term "herein" refers to the specification, claims, and drawings associated with the current application. The phrases "in one embodiment," "in another embodiment," "in various embodiments," "in some embodiments," "in other embodiments," and other variations thereof refer to one or more features, structures, functions, limitations, or characteristics of the present disclosure, and are not limited to the same or different embodiments unless the context clearly dictates otherwise. As used herein, the term "or" is an inclusive "or" operator, and is equivalent to the phrases "A or B, or both" or "A or B or C, or any combination thereof," and lists with additional elements are similarly treated. The term "based on" is not exclusive and allows for being based on additional features, functions, aspects, or limitations not described, unless the context clearly dictates otherwise. In addition, throughout the specification, the meaning of "a," "an," and "the" include singular and plural references.

As referred to herein, an "object" is a physical thing or item. Examples of objects include, but are not limited to, cars, planes, trains, boats, people, buildings, or other mobile or stationary things. Objects include participant objects and non-participant objects, which can be mobile or stationary. As referred to herein, a "participant" is an object that includes a computing device that can communicate specific, predetermined types of information and data to other participant objects via line-of-sight communications. In some embodiments, each participant may be a member of a universal service-level agreement to identify which objects are participants, which allows for participants to communicate with one another without having to get user authorization for each individual connection between participants.

As referred to herein, a "non-participant" is an object that does not include a computing device that can communicate the same specific, predetermined types of information and data with a participant object. As discussed in more detail herein, participants can be mobile or stationary and may include computing devices of different sizes having different computing or networking capabilities. Throughout this disclosure, the term "participant" is used interchangeably with "participant object" and "participant computing device" and other related variations, and the term "non-participant" is used interchangeably with "non-participant object" and other related variations.

As referred to herein, "line-of-sight communication" refers to wireless transmission of information from a participant to another participant without other retransmission devices. Accordingly, line-of-sight is the maximum range one participant can communicate wirelessly with another participant without significant data lose. Examples of wireless transmissions used in line-of-sight communications include Bluetooth, Wi-Fi, ADSB, TCAS, or other protocols now known or developed in the future. In some embodiments, all communications between participants utilize a common protocol.

Figure 1B:
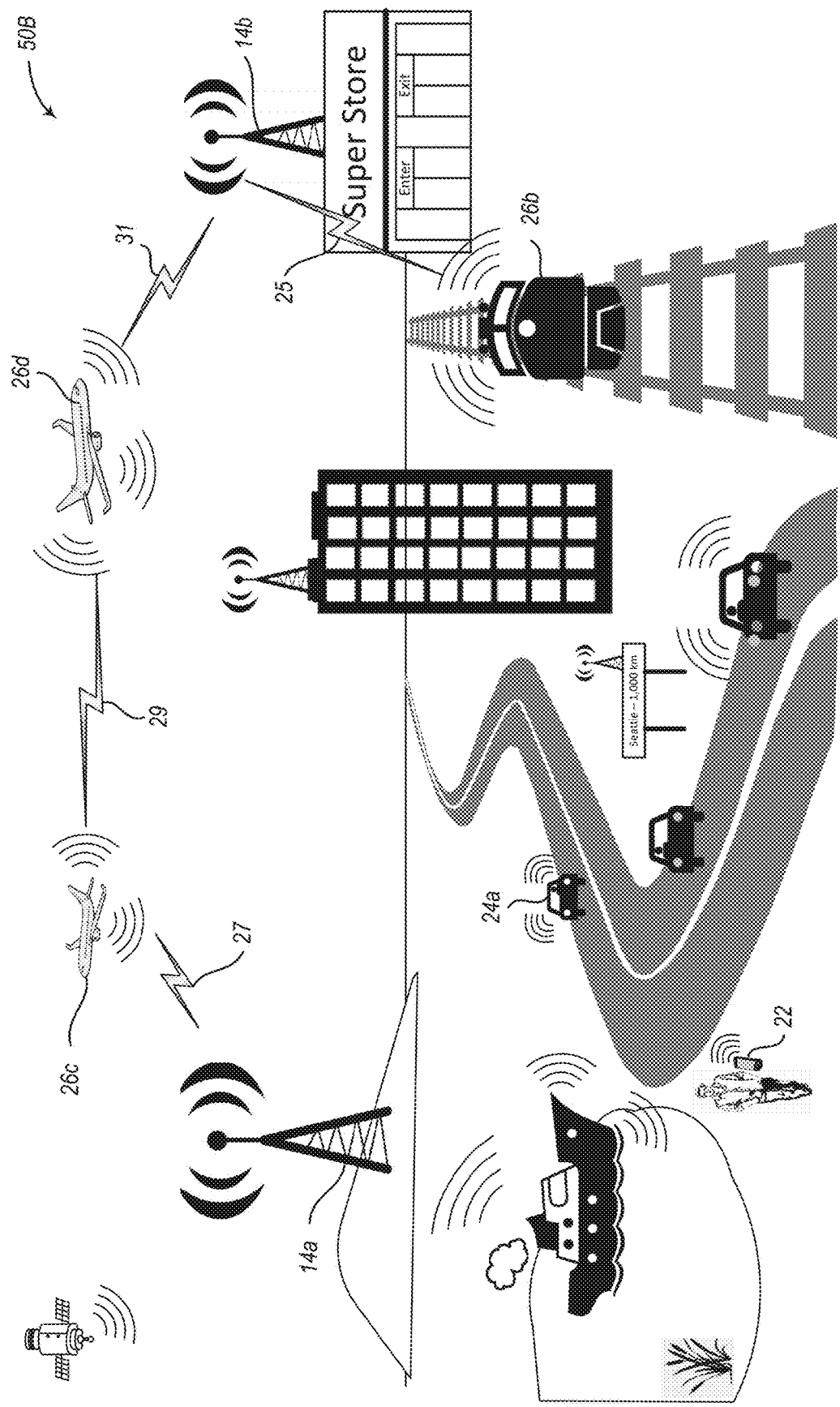

FIGS. 1A-1B illustrate context diagrams of an environment for establishing a cognitive heterogeneous ad hoc mesh network in accordance with embodiments described herein. Environment 50A in FIG. 1A includes a plurality of mobile participants (referenced in some figures as mobile participants 36), a plurality of stationary participants (referenced in other figures as stationary participants 34), and a plurality of non-participants 28. As mentioned above, the stationary participants and the mobile participants can communicate specific types of information or data with one another, but cannot communicate the same types of information with the non-participants 28.

The plurality of mobile participants includes tier 1 mobile participants 22, tier 2 mobile participants 24, and tier 3 mobile participants 26. The three tiers of mobile participants are generally separated by the computing and networking capabilities of the computing devices associated with the mobile participant. The computing and networking capabilities may be limited or determined by the amount of power available or utilized by a mobile computing device, the amount of processing power available, or the size, type, or accuracy of the antenna utilized, etc.

For example, tier 1 mobile participants 22 typically have the smallest available power, lowest processing power, smallest bandwidth, shortest ranged antenna, lowest power output, lowest accuracy, and slowest update rate. Examples of tier 1 mobile participants 22 include, but are not limited to, mobile phones, laptop computers, tablet computers, wearable computing devices, or other smaller, low power, low transmission mobile computing or Internet-Of-Things devices. In the example illustrated in FIG. 1A, there is only a single tier 1 mobile participant 22, which happens to be a mobile phone in this example. However, other numbers and types of tier 1 mobile participants 22 may also be employed.

Tier 2 mobile participants 24 typically have medium power constraints, a medium amount of processing power, medium bandwidth, medium range capabilities, medium accuracy, and medium update rate. Examples of tier 2 mobile participants 24 include, but are not limited to, automobiles, small personal boats, personal aircrafts, or other medium power, medium transmission, power regenerating mobile computing devices or objects that can support such mobile computing devices. FIG. 1A illustrates example tier 2 mobile participants 24 as including automobiles 24a and 24b. However, other numbers and types of tier 2 mobile participants 24 may also be employed.

Tier 3 mobile participants 26 typically have the largest available power, highest processing power, highest bandwidth, longest transmit and receive capabilities, highest accuracy, and fastest update rate among mobile participant computing devices. Example tier 3 mobile participants 26 include, but are not limited to, commercial airline planes, semi-trucks, cargo ships, trains, or other objects that can support larger, high power, high transmission mobile computing devices or objects that can support such mobile computing devices. FIG. 1A illustrates example tier 3 mobile participants 26 as including boat 26a, train 26b, and airplanes 26c and 26d. However, other numbers and types of tier 3 mobile participants 26 may also be employed.

Various embodiments described herein refer to mobile aerial participants or mobile ground participants. Mobile aerial participants and mobile ground participants are mobile participants. Thus, mobile aerial participants and mobile ground participants may likewise be separated into the three-tiers of participant capabilities.

For example, tier 1 mobile aerial participants may include personal computing devices that are onboard an airplane, such as user devices; tier 2 mobile aerial participants may include general aviation aircraft; and tier 3 mobile aerial participants may include cargo aircraft and commercial aircraft. Tier 1 mobile ground participants may include personal computing devices that are on a person walking down the street or on a car or in a boat; tier 2 mobile ground participants may include automobiles or recreational watercraft; and tier 3 mobile ground participants may include semi-trucks and cargo ships.

In some embodiments, one or more of these tiers may be further separated by capabilities or expected utilization. For example, tier 3 mobile aerial participants may include tier 3A mobile aerial participants that include cargo aircraft and tier 3B mobile aerial participants that include commercial aircraft. One situation where this distinction may occur is where a commercial aircraft is handling a lot of data requests from user devices onboard the aircraft (e.g., tier 1 mobile aerial participants), which may impact that aircraft's throughput for forwarding communications between other participants. Conversely, a cargo aircraft is typically not handling a lot of data request from user devices onboard the aircraft, but is instead primarily being used to forward communications between other participants.

Although some embodiments may be described herein with respect to mobile aerial participants, embodiments are not so limited. Those same embodiments may instead utilize mobile ground participants or a combination of mobile ground participants and mobile aerial participants, unless the context clearly indicates otherwise.

The plurality of stationary participants includes ground entry points 14, remote entry points 16, and access nodes 18. In some embodiments, stationary participants may be referred to as ground participants. Similar to the three tiers of mobile participants, the ground entry points 14, remote entry points 16, and access nodes 18 are generally separated by computing and networking capabilities, and footprint size in some embodiments.

For example, ground entry points 14 typically have the largest available power, highest processing power, highest bandwidth, and longest range antenna capabilities. Example locations of ground entry points 14 include, but are not limited to, cellular towers, airports, large retail or superstores, or other locations that can support large sized, high power, high transmission stationary computing devices. FIG. 1A illustrates example ground entry points 14 as including tower antenna 14a and superstore 14b. However, other numbers and types of ground entry points 14 may also be employed.

Remote entry points 16 typically have medium power constraints, a medium amount of processing power, medium bandwidth, and medium range capabilities. Example locations of remote entry points 16 include, but are not limited to, restaurants and coffee shops, airfields and train stations, satellites, or other locations that can support medium sized, medium power, medium transmission stationary computing devices. FIG. 1A illustrates example remote entry points 16 as including store antenna 16a and satellite 16b. However, other numbers and types of remote entry points 16 may also be employed.

Access nodes 18 typically have the smallest available power, lowest processing power, lowest bandwidth, and shortest range antenna capabilities of the stationary participants. Example locations of access nodes 18 include, but are not limited to, road intersections, train crossings, road signs, mile markers, crosswalks, or other locations that can support smaller, low power, low transmission stationary computing devices. In the example illustrated in FIG. 1A, there is only a single access node 18, which happens to be a road sign in this example. However, other numbers and types of access nodes 18 may also be employed.

As described in greater detail below, the mobile and stationary participants communicate with one another to pass information from one participant to another, which is further illustrated in FIG. 1B.

Environment 50B in FIG. 1B provides additional details regarding environment 50A in FIG. 1A, and likewise includes a plurality of mobile participants, a plurality of stationary participants, and a plurality of non-participants. Participants can communicate with other participants or with non-participants by forwarding communications between participants. Each participant utilizes a locally stored participant table to determine a next participant in which to send communications along an optimum route between the sending participant and the destination device, which is described in more detail below.

Briefly, however, in this example, participant airplane 26c is attempting to communicate with participant train 26b. If participant airplane 26c is within line-of-sight of train 26b, then the two participants could communicate directly with one another. But if airplane 26c cannot directly communicate with train 26b, then airplane 26c will communicate with train 26b via other participants.

Airplane 26c utilizes a participant table to identify one or more routes from airplane 26c to train 26b via zero, one, or a plurality of other participants. For example, airplane 26c may identify route_1 as airplane 26c to airplane 26d to superstore 14b to train 26b; and route_2 as airplane 26c to tower 14a to superstore 14b to train 26b. From route_1 and route_2, airplane 26c identifies an optimum route based on a total score determined for each route based on information in the participant table. As discussed in more detail below, a route's total score is based on a combination of individual scores for each participant pair along a route with each individual score being calculated based on a weighted combination of a plurality of different characteristics of the communication link between the participants of the corresponding pair. Creation and update of the participant table is discussed in more detail below.

In this example, assume airplane 26c determines that route_2 is the optimum route. Airplane 26c sends communication messages destined for train 26b to tower 14a via communication link 27. In some embodiments, airplane 26c includes additional route details with the communication messages to provide guidance to each participant along route_2 so that each participant along the calculated route can forward the communication messages to a next participant without having to re-calculate the route. Thus, the additional route details may identify superstore 14b as the next participant after tower 14a, and tower 14a can forward the received messages to superstore 14b based on this additional route details. In this case, tower 14a may forward the messages to superstore 14b via a wired communication network.

In some embodiments, each participant that forwards a communication message may modify the additional route information to remove route information for previous participants along the route, which allows subsequent participants to transmit less and less data for each hop along the route. In other embodiments, the additional route information is maintained so that the destination participant knows the route of the messages and can reuse the same route to transmit return messages to the originally sending participant, or the destination can recalculate a new route.

In some embodiments, a participant along the route may determine that it should re-calculate a route from that participant to the destination participant. In one embodiment, this determination may be based on the participant not being able to transmit messages to the next participant identified in the additional route information included with the messages, such as if the participant and the identified next participant are no longer in line-of-sight communication with one another. In another embodiment, the participant may re-calculate the route if the connection between the participant and the next participant has significantly deteriorated, e.g., the individual score between that corresponding participant pair has exceeded a threshold value. In one example, the individual score may change based on a system limitation of the participant or the next participant, such as if Doppler effects between the participant and the next participant exceeds a threshold value based on the antenna capabilities of the participant and the next participant. For the illustrated example, tower 14*a* may perform similar actions as airplane 26*c* by using the participant table to determine a next participant in which to forward the messages destined to train 26*b*.

Similar to what is described above, superstore 14*b* may forward the messages to train 26*b* via communication link 25 based on the additional route information included with the messages, or by performing similar actions as airplane 26*c* and using the participant table to determine a next participant in which to forward the messages destined to train 26*b*. In this case superstore 14*b* send the messages directly to train 26*b* via communication link 25.

In some other embodiments, each participant may recalculate a route from the corresponding sending participant to a next participant towards a destination participant without including additional route information, which may increase latency between an initial sending participant and the destination participant but can reduce the amount of data transmitted with each message.

If, however, airplane 26*c* determines that route_1 is the optimum route, then airplane 26*c* sends communication messages destined for train 26*b* to airplane 26*d* via communication link 29. Airplane 26*d* performs similar actions as airplane 26*c* by using the participant table to identify an optimum route and sends the communication messages via communication link 31 to superstore 14*b*, which performs similar actions and send the messages directly to train 26*b* via communication link 25.

In these examples, the communication links 25, 27, 29, and 31 are line-of-sight communication transmissions from one participant computing device to another. As described elsewhere herein, these transmissions may be non-directional transmissions or they may be directional transmissions.

Even though FIGS. 1A and 1B are illustrated with stationary participants, the line-of-sight communications described herein enables mobile participants to communicate with one another without having to be in line-of-sight communication of a stationary participant, which reduces the need for a complex stationary infrastructure. Moreover, embodiments described herein enable mobile participants to communicate with one another even if the stationary participants become unavailable or if wired communication networks between stationary participants become interrupted. Moreover, the stationary participants can communicate with other participants without the need for specialty hardware for different cellular carriers or networks, rather it can rely on common line-of-sight wireless protocols, such as Wi-Fi technology under the IEEE 802.11 standards, as well as ad hoc protocols now known or developed in the future.

Figure 5:
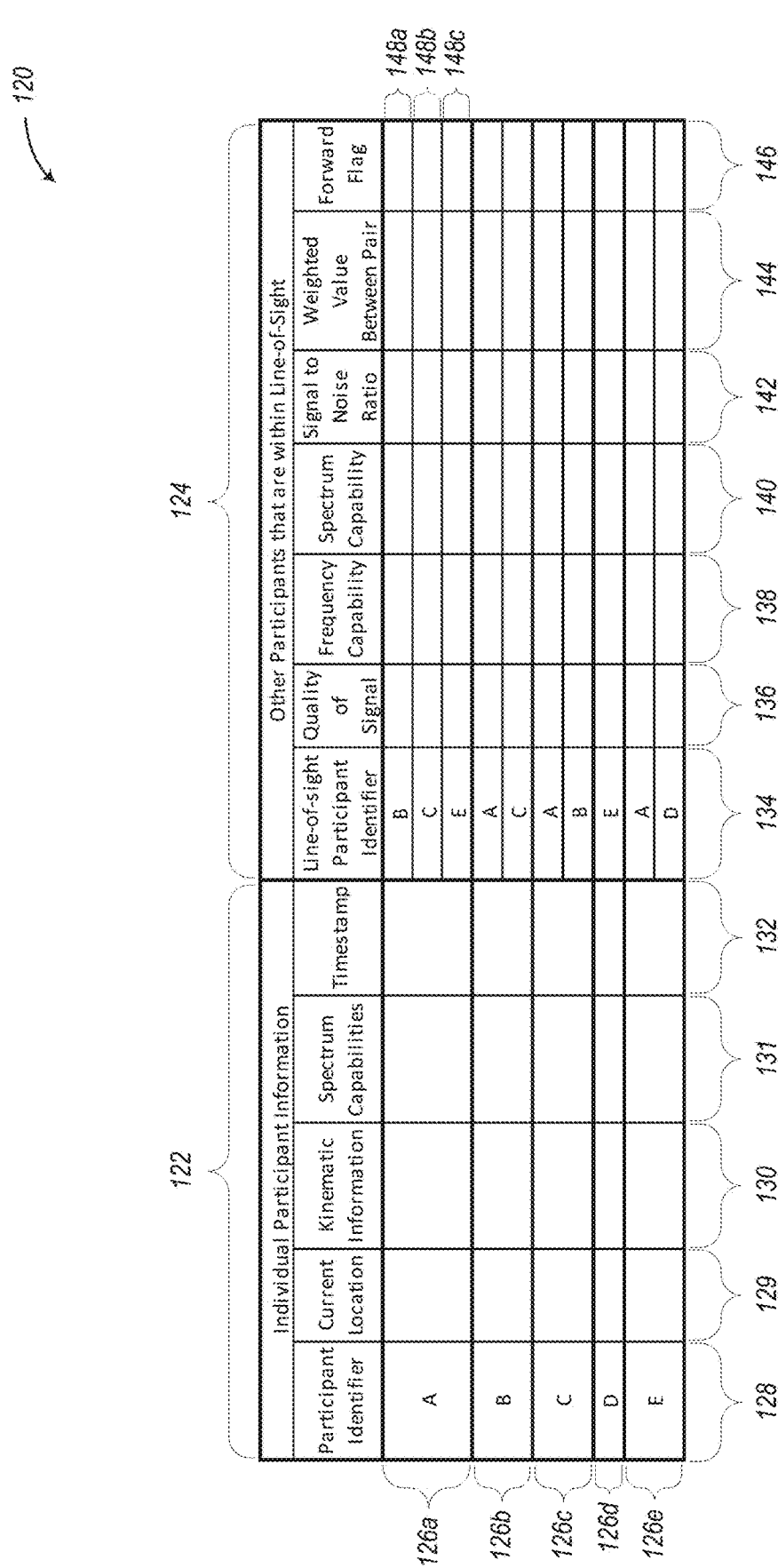
FIG. 5 illustrates an example participant table that tracks participants in the cognitive heterogeneous ad hoc mesh network in accordance with embodiments described herein.

As mentioned above, each participant can select another participant through which it can forward communication messages based on a participant table. The participant table identifies each participant, where each participant is located, how each participant is moving, which participants are within line-of-sight of each other, and various different characteristics or communication capabilities between line-of-sight participants. Creating, updating, and using the participant table is described below, and one example participant table is illustrated in FIG. 5.

The overarching cognitive heterogeneous ad hoc mesh network created by the mobile and stationary participants described above in conjunction with FIGS. 1A-1B provides a backbone for a multi-layered network that enables one participant to communicate with another participant, while also providing safety measures to avoid collisions among participants and non-participants.

Figure 2A:
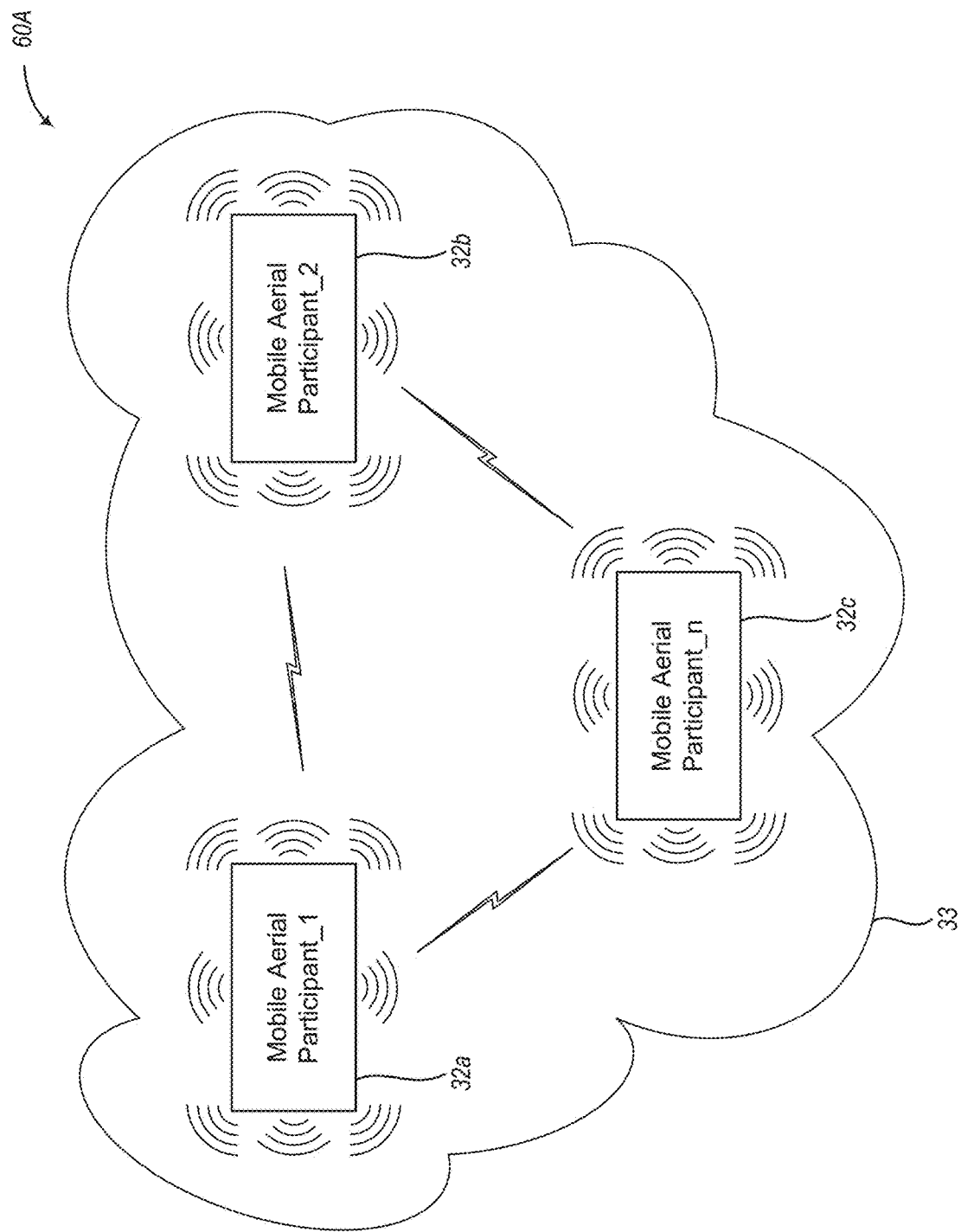
Figure 2B:
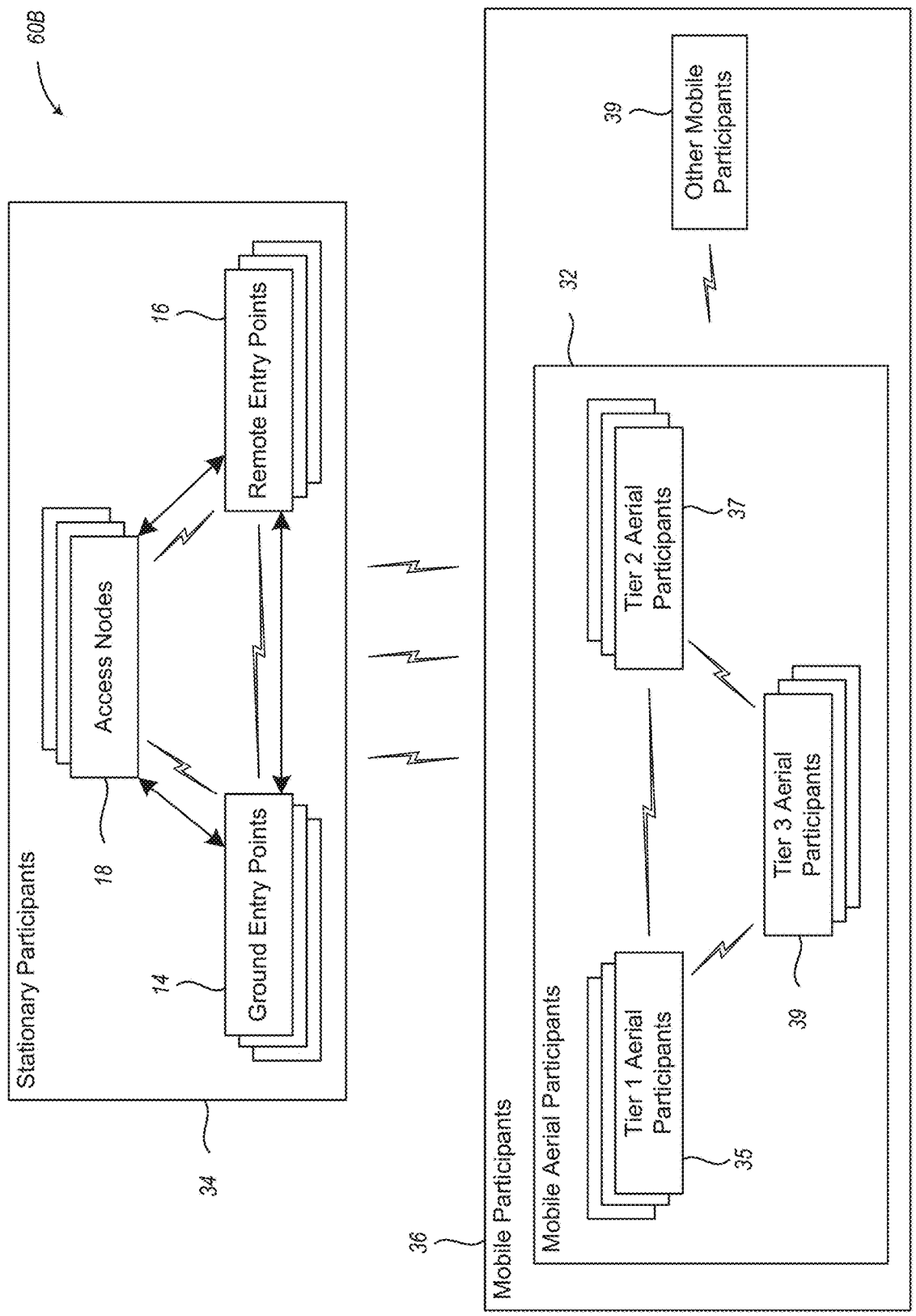

FIGS. 2A-2C illustrate block diagrams of the different layers of the cognitive heterogeneous ad hoc mesh network in accordance with embodiments described herein. FIG. 2A illustrates an example 60A of a communications network 33 between a plurality of mobile aerial participants 32*a*-32*c*. Although FIG. 2A only illustrates three mobile aerial participants as creating network 33, embodiments are not so limited and one or a plurality of mobile aerial participants may be employed. Similarly, the network 33 may be established from other types of mobile participants, including various combinations of tier 1 mobile participants, tier 2 mobile participants, or tier 3 mobile participants, which perform many of the same functions as the mobile aerial participants.

Each mobile aerial participant 32*a*-32*c* transmits radio frequency signals to be received by other mobile aerial participants 32 that are within line-of-sight of the sending mobile aerial participant 32. These signals include, but are not limited to (1) data signals that transmit messages or data to another participant and (2) notification signals that provide personalized information regarding the sending mobile participant. In some embodiments, the notification signals are referred to as self-reporting messages or self-reporting signals. The notification signals can include one or both of notification signals for networking and routing among participants and notification signals for safety and de-confliction of possible threats.

The notification signals serve three primary simultaneous purposes: (1) to notify other participants of the sending participant's identity, position, and kinematic information; (2) to detect and track non-participant objects; and (3) to establish routing and network efficiencies (i.e., to create the participant table described herein). In various embodiments, the notification signals provide individualized information regarding the sending mobile aerial participant 32 so that other mobile aerial participants 32 know that they are within line-of-sight communication of the sending mobile aerial participant 32 within network 33. As mentioned above, these notification signals may be referred to as self-reporting signals, since the mobile aerial participant 32 is independently reporting its position and kinematic information to any other mobile aerial participants 32 that are within line-of-sight of the transmitting mobile aerial participant 32 without being prompted or requested by another mobile (or stationary) participant. The mobile aerial participants 32 utilize the notification signals to generate a participant table that is utilized to transmit data signals between the mobile aerial participants 32.

In various embodiments, the information in the notification signal includes the mobile aerial participant's 32 identification information, geolocation, kinematic information, throughput capabilities, frequency capabilities, and other information. In various embodiments, the notification signals also include transmission time information that allows for Time Distance of Arrival (TDOA) and Time of Flight (TOF) or Round Trip Timing (RTT) calculations.

The geolocation of the mobile aerial participant 32 may be determined via traditional methods like GPS sensors or modules, cell tower or stationary participant signal triangulation, or via notification messages from other devices or participants that know or estimate the position or location of the mobile aerial participant 32. This can be accomplished with extreme accuracy and minimal latency when notification messages are echoed and supported by stationary participants. The geolocation may also be referred to as the position or location of the mobile aerial participant 32.

The kinematic information may be obtained by monitoring the mobile aerial participant's 32 position and identifying changes over time, utilizing various sensors to calculate or determine the kinematic information, or obtaining it from another system.

The frequency capabilities of the mobile aerial participant 32 may be predetermined based on the type of hardware utilized by the mobile aerial participant 32. For example, the hardware of the mobile aerial participant 32 may be designed to utilize ACARS, IEEE 802.11 standards, or some other wireless transmission frequencies or standards, which defines the frequency capabilities of the mobile aerial participant 32. In other embodiments, the frequency capabilities may be predetermined based on government regulations regarding available frequencies. In yet other embodiments, the frequency capabilities may be defined by a user or administrator.

The throughput may be predetermined based on the type of hardware utilized by the mobile aerial participant 32 or on the current processing capacity or network traffic of the mobile aerial participant 32 or a number of other factors. For example, if the mobile aerial participant 32 is a Boeing 737-700 then it may have more throughput capabilities than a Boeing 777-200ER because the Boeing 737-700 may have less passengers and thus may be supporting fewer data requests from user device onboard the airplane, which can allow for more possessing power to be directed towards forwarding communications between other participants.

In some embodiments, notification signals are transmitted via directional broadcast beams. In other embodiments, the notification signals may be transmitted using non-directional broadcast signals. In general, the use of the term "broadcast" herein refers to the transmission of a signal by a sending participant without being requested by another participant and does not have a specific participant as a destination. In various embodiments, directional notification signals may be transmitted in a sequential or non-sequential 360-degree pattern, so that the notification signal is transmitting in all directions surrounding the participant.

Use of directional transmissions can reduce the amount of power needed to transmit the notification signal or other communication to another participant. Moreover, the use of directional transmissions enables the sending participant to use just enough power to ensure it gets to its intended target. The participant table described herein enables the participants to calculate the required transmit power for transmission without wasting extra power on an overly powerful transmission. Additionally, directional transmissions can reduce interference between transmissions in a congested space as well as make transmissions more secure.

The notification signal may be broadcast periodically, at predetermined times, dynamically selected based on number and proximity of other mobile aerial participants, or at a given dynamically changing update rate. In some embodiments, the rate at which the mobile aerial participant 32 transmits its notification signal may change based on a combination of the distance, closure velocity, and closing angles between the sending mobile aerial participant 32 and other mobile aerial participants 32 within line-of-sight of the sending mobile aerial participant 32.

As mentioned above, the mobile aerial participants 32a-32c broadcast notification signals to inform other mobile aerial participants 32 of their position and movement. For example, mobile aerial participant 32a broadcasts notification signals with information identifying itself and its respective geolocation and kinematic information without regard to the presence or location of mobile aerial participants 32b or 32c. If mobile aerial participant 32c is within line-of-sight of mobile aerial participant 32a, mobile aerial participant 32c receives the broadcasted notification signals from mobile aerial participant 32a and utilizes the information in the notification signals, and its own location and kinematic information, to identify the position and movement of mobile aerial participant 32a relative to itself.

The mobile aerial participants 32 can utilize the notification signals to track other participants and non-participants (e.g., by using echo signals of the notification signals to locate objects) and to create and update the participant table to identify which participants are in network 33, their location, their capabilities, and who they are in line-of-sight communication.

As mentioned above, the notification signals are utilized to generate and maintain a participant table so that the mobile aerial participants 32 can transmit messages or data to one another within network 33. For example, the participant table is utilized to determine a recipient participant. The sending mobile aerial participant 32 then transmits a data signal destined for a target mobile aerial participant 32. The data signals are used to transmit the desired messages or data to other participants, which is described in more detail below in conjunction with FIG. 2B. Briefly, the various communications between the mobile aerial participants 32a-32c creates a communication network 33 among each other that enable them to communicate with one another without the use of another communication backbone, such as a cellular tower network.

Similar to the notification signals, the data signals may be transmitted via directional transmission beams or non-directional transmission signals. In various embodiments, the sending mobile aerial participant 32 utilizes the participant table to determine a location of the recipient participant. The sending mobile aerial participant 32 can directionally focus the transmitted data signals towards the recipient participant based on the position of the sending participant and the position of the recipient participant. The use of directional transmissions can reduce power consumption and increase the range in which transmission can be received, while also reducing interference between transmissions in a congested space.

Although not illustrated, other mobile participants and stationary participants may also perform similar actions as described above to identify and track mobile participants that are in line-of-sight to support management of the participant table and to communicate data or information amongst themselves to increase accuracy and efficiency of each participant.

FIG. 2B illustrates a block diagram of the communication or middle layer of the multi-layered safety and communication network. Example 60B in FIG. 2B includes mobile participants 36 and stationary participants 34. The mobile participants 36 include mobile aerial participants 32 and other mobile participants 39. The mobile aerial participants 32 may include one or more tier 1 mobile aerial participants 35, one or more tier 2 mobile aerial participants 37, one or more tier 3 mobile aerial participants 37, or some combination thereof. The other mobile participants 39 may include one or more mobile ground participants. The stationary participants 34 include one or more ground entry points 14, one or more remote entry points 16, one or more access nodes 18, or some combination thereof.

Each mobile aerial participant 32 can communicate with other mobile aerial participants 32 or other mobile participants 39 that are within line-of-sight of the sending mobile participant. Accordingly, tier 1 mobile aerial participants 35 may transmit data to or receive data from other tier 1 mobile aerial participants 35, tier 2 mobile aerial participants 37, or tier 3 mobile aerial participants 39; tier 2 mobile aerial participants 37 may transmit data to or receive data from other tier 2 mobile aerial participants 37, tier 1 mobile aerial participants 35, or tier 3 mobile aerial participants 39; and tier 3 mobile aerial participants 39 may transmit data to or receive data from other tier 3 mobile aerial participants 39, tier 1 mobile aerial participants 35, or tier 2 mobile aerial participants 37. Likewise, tier 1 mobile aerial participants 35, tier 2 mobile aerial participants 37, and tier 3 mobile aerial participants 39 may also transmit data to or receive data from the other mobile participants 39.

Moreover, each mobile participant 36 can transmit data to or receive data from stationary participants 34 via line-of-sight communications. For example, tier 1 mobile aerial participants 35 may transmit data to or receive data from ground entry points 14, remote entry points 16, or access nodes 18; tier 2 mobile aerial participants 37 may transmit data to or receive data from ground entry points 14, remote entry points 16, or access nodes 18; tier 3 mobile aerial participants 39 may transmit data to or receive data from ground entry points 14, remote entry points 16, or access nodes 18; and the other mobile participants 39 may transmit data to or receive data from ground entry points 14, remote entry points 16, or access nodes 18.

Similarly, stationary participants 34 can transmit data to or receive data from other stationary participants 34 via line-of-sight communications or via wired communications. Accordingly, ground entry points 14 may transmit data to or receive data from other ground entry points 14, remote entry points 16, or access nodes 18; remote entry points 16 may transmit data to or receive data from other remote entry points 16, ground entry points 14, or access nodes 18; and access nodes 18 may transmit data to or receive data from other access nodes 18, ground entry points 14, or remote entry points 16.

Although FIG. 2B illustrates three tier 1 mobile aerial participants 35, three tier 2 mobile aerial participants 37, three tier 3 mobile aerial participants 39, three ground entry points 14, three remote entry points 16, and three access nodes 18, embodiments are not so limited and embodiments may include more or fewer mobile participants 36 or more or fewer stationary participants 34 than what is illustrated.

The messages or information contained in the data transmissions may have originated by the sending participant or it may have originated by another computing device and is now being forwarded by the sending participant. In some embodiments, the data may originate at one participant and be destined for another participant. In other embodiments, the data may originate at a non-participant computing device (e.g., content servers, web servers, remote networks, etc.) and be destined for a participant. In yet other embodiments, the data may originate at one participant and be destined for a non-participant computing device.

If the sending participant is within line-of-sight to a destination participant, then the originating participant sends the message or data directly to the destination participant. But if the sending participant is not within line-of-sight to the destination computing device, then the sending participant transmits the message or data to another participant who can continue to forward the message or data toward the destination computing device, which may include one or more "hops" between mobile or stationary participants.

In some embodiments, the data signals may be transmitted whenever the participant has data to be sent and has bandwidth or computing power to transmit the data. In other embodiments, the data may be buffered for a period of time until it can be successfully transmitted from the sending participant to another mobile or stationary participant.

In various embodiments, the participants may use one of various different frequencies to transmit data signals to other participants. In some embodiments, participants scan the entire spectrum or spectrums they are physically able, and legally allowed, to transmit within. Each participant determines based on real-time and historical data what frequencies are available and the length of transmission that can be transmitted without interference on each frequency, as well as what transmitters are available on the participant. In some embodiments, the participants may utilize Dynamic Spectrum Access (DSA) to use multiple frequencies for a single transmission to make full use of the available spectrum. Participants can "sniff" the spectrum and identify free space to use and make such information available to other participants via the participant table. For example, if an airplane is in a thunderstorm it can identify and avoid those frequencies that are unusable for use in unstable whether, and it knows what participants are within range and what frequencies they have available to retransmit to a stationary participant, if required. From this information in the participant table, the aircraft can choose the appropriate frequency/frequencies to transmit on to obtain the highest data-rate while maintaining a signal to noise ratio that ensures data packet reception.

In various embodiments, each participant determines a Quality of Service (QOS) and Signal to Noise Ratio (SNR) between it and each other participant in line-of-sight of that participant, as well as available frequencies to the receiving participant. The participant then assesses the data it needs to transfer and chooses the most efficient frequency with a high QOS and SNR on which to transmit. Moreover, participants may utilize additional information to select what frequencies to transmit data. For example, if a participant is in a thunderstorm, it selects frequencies that are more suitable for use in inclement weather.

The participant can cross reference the throughput and frequency abilities of the other participants, via the participant table, to determine the path and frequency on which to send the data. Once that is determined, the participant can route the data and amplify the signal based on the frequency, distance or latency to the chosen participant, and any known interference values it may have.

In some embodiments, each participant utilizes protocols to establish transmit priorities based on the participant's role at any given moment. For example, an aircraft prioritizes safety of flight information first, then ATC communications, navigation, identification, headquarter communication, then Internet/entertainment connectivity. A cell phone, depending on environment, may act in different ways. For example, at home, it may prioritize Wi-Fi frequencies and prioritize voice communications, then text, then Internet, then email. However, when the cell phone is in a car traveling down the road, the cell phone can use its gyrometers and accelerometers to detect that you are in a vehicle and set the priorities for V2X (vehicle to vehicle/Infrastructure/Pedestrians/other transportation) above voice, text and Internet data exchanges. In contrast, if the cell phone is in a bus or train it may not transmit V2X information.

As mentioned above with respect to FIGS. 2A and 2B, the multi-layered network allows each participant to track other participants that are local or proximal to the participant, while also tracking transmitted data among participants. The multi-layered network also includes a top layer that provides global tracking of participants and non-participants, and data communication with non-participant computing devices, which is illustrated in FIG. 2C.

FIG. 2C illustrates a block diagram of the highest layer of the multi-layered network. Example 60C in FIG. 2C includes mobile participants 36, stationary participants 34, and network operation center server 40.

Mobile participants 36 and stationary participants 34 employ embodiments described herein to transmit notification signals to generate a participant table to track participants, their location, and the communication characteristics between line-of-sight participants. In various embodiments each stationary participant 34 stores a complete copy of the participant table. When a stationary participant 34 receives an update to the participant table from a mobile participant 36, the stationary participant 34 transmits the update to the other stationary participants 34. The stationary participants 34 also transmit, upon receipt of an update or at predetermined times, the total participant table or only a portion thereof to the mobile participants 36 that are in line-of-sight communication of that corresponding stationary participant 34, which can then be forwarded by the mobile participants 36 to other non-line-of-sight mobile participants 36.

In some other embodiments, the stationary participants 34 may maintain or store a portion, but not all, of the total participant table. For example, each stationary participant 34 stores the portion of the participant table for mobile participants 36 that are within a predetermined distance or number of hops away from the corresponding stationary participant 34. In at least one such embodiment, the stationary participants 34 may provide updates to the network operation center server 40 via communication network 52, which can then distribute the update, i.e., only the update, the total participant table, or a portion of the participant table, to other stationary participants 34. In some embodiments, the network operation center server 40 or the stationary participants 34 can add additional information to the participant table, such as the location of non-participants, which may be obtained from FAA reports, weather radar, local tracking by the mobile participants 36 or the stationary participants 34, or other sources.

As discussed herein, mobile participants 36 utilize the participant table to transmit or forward data or data requests to other mobile participants 36 or to non-participant computing devices 54. Accordingly, the mobile participants 36 communicate with stationary participants 34 (either via line-of-sight communications or via one or more other mobile participants 36) to send and receive data to and from the non-participant computing devices 54 via communication network 52.

The communication network 52 may be any wired or wireless communication network that facilitates the transmission of information from stationary participants 34 to network operation center server 40. In some embodiments, communication network 52 may be the Internet.

In various embodiments, the mobile participants 36 may also provide additional information to the stationary participants 34 and to the network operation center server 40. For example, in some embodiments, the mobile participants 36 may utilize echo signals from the notification signals to track non-participant objects 38, which is described in more detail in U.S. patent application Ser. No. 15/892,259, filed Feb. 8, 2018, entitled "Object Tracking Using A Cognitive Heterogeneous Ad Hoc Mesh Network."

Figure 3A:
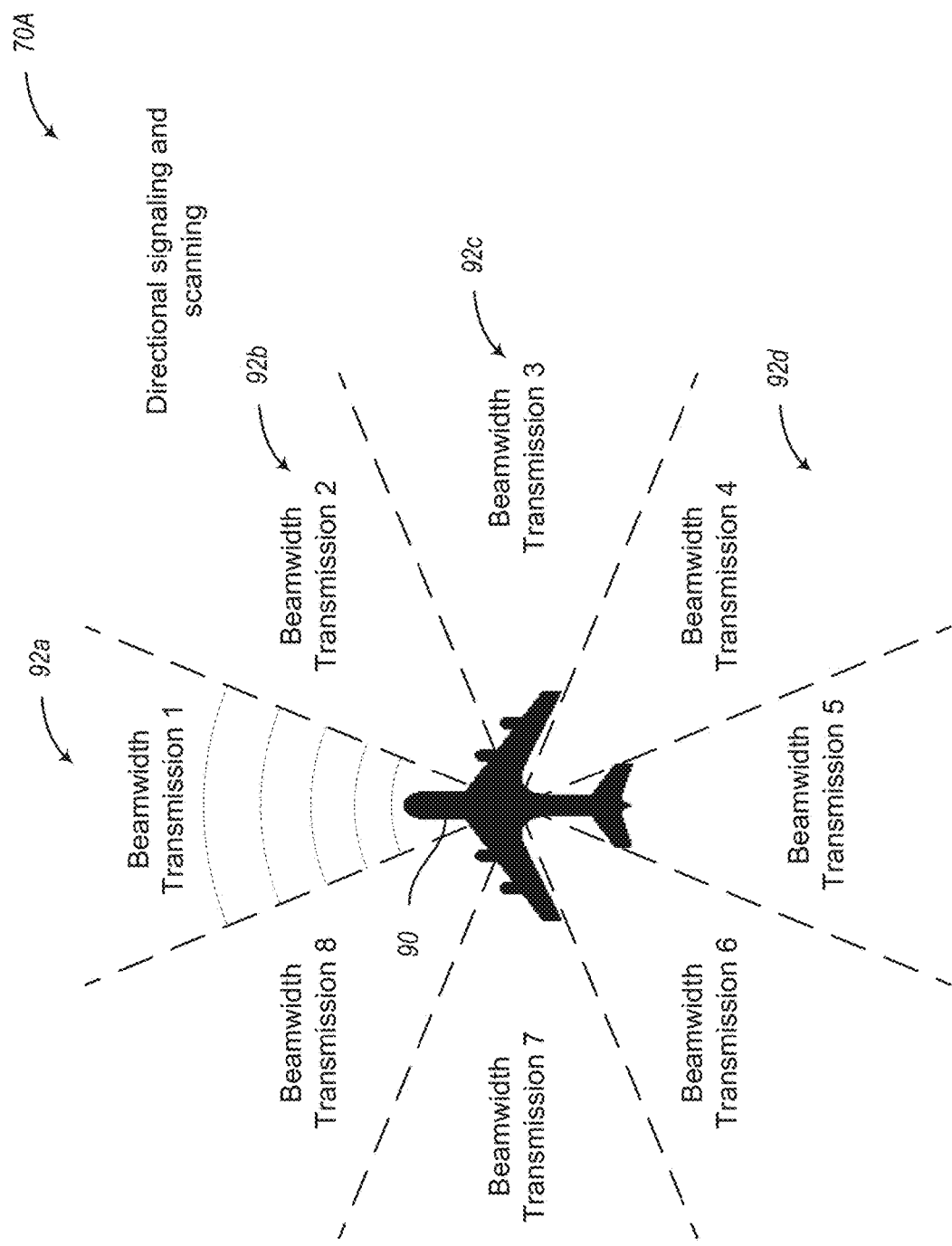
FIGS. 3A-3B illustrate context diagrams of using directional signaling and scanning to provide directional communication between participants in accordance with embodiments described herein.
Figure 3B:
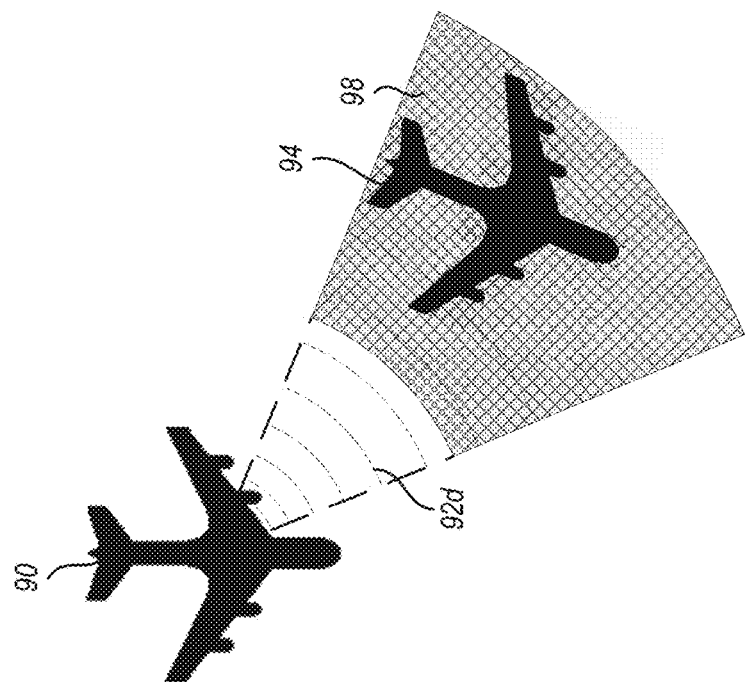

FIGS. 3A-3B illustrate context diagrams of using directional signaling and scanning to provide directional communication between participants in accordance with embodiments described herein. FIG. 3A illustrates an example 70A of first participant 90, such as an airplane, transmitting directional notification signals 92a-92d. As shown, each notification signal 92 is transmitted away from the first participant 90 at a particular angle with a particular beamwidth. In various embodiments, the first participant 90 waits a predetermined amount of time before transmitting the next notification signal 92 at the next angle. In other embodiments, the first participant 90 may continuously transmit the next notification signal at the next angle and utilize phased, frequency, and polarity shifts to allow for simultaneous transmission and reception of notification signals. The beamwidths of the notification signals 92 may not overlap, e.g., as illustrated in FIG. 3A, or they may partially overlap one another.

In the illustrated example in FIG. 3A, the first participant 90 transmits eight notification signals with 45 degree beamwidth to cover 360 degrees around the first participant 90. Although FIG. 3A illustrates the notification signals as two-dimensional transmissions, embodiments are not so limited, and the notification signals may be transmitted as three dimensional signals, such as a cone shape. In some embodiments, the first participant 90 may transmit a first set of notification signals at a first elevation, e.g., with a center of the transmission on a horizontal axis from the first participant, and a second set of notification signals at a second elevation, e.g., with a center of the transmission at a 30 degree angle towards the ground. The first participant 90 may continue with additional sets of notification signals as different vertical or elevational angles to create a three-dimensional coverage area.

In various embodiments, the first participant 90 transmits the notification signals 92 in a sequential order. For example, notification signal 92a is transmitted first, followed by notification signal 92b, which is followed by notification signal 92c, and so on. A complete transmission cycle occurs when all eight notification signals 92 have been transmitted. A complete transmission cycle is used to notify other participants within line-of-sight of the first participant 90 of the first participant's 90 location and kinematic information. Although FIG. 3A illustrates eight notification signals being used for a complete transmission cycle, other numbers of notification signals at other beamwidths may also be utilized.

In various embodiments, a complete transmission cycle is performed at a given update rate, which may be predetermined or may dynamically change. For example, in some embodiments, the update rate may be faster when there are more participants or non-participant objects near the first participant 90, compared to when there are few or no objects near the first participant 90. In other embodiments, the update rate may be faster when the first participant 90 is moving at a higher speed compared to when the first participant 90 is moving at a slower speed.

In some embodiments, the first participant 90 may also maintain individualized update rates for each participant that is in line-of-sight of the first participant 90. However, since the first participant 90 does not request the positional information from other participants, it can utilize only the received notification signals based on the update rate, while ignoring every other notification signal from the other participant. For example, if another participant is transmitting notification signals once every second, but the first participant 90 has an update rate of once every five seconds for the other participant, then it may utilize one of the five notification signals that it receives in a five second period while ignoring the rest. This individualized update rate may dynamically change based on the distance and velocity of closure between the first participant 90 and the other participant object. In this way, the first participant 90 utilizes more notification signal from the first participant 90 when the other participant and the first participant 90 are closer together or traveling towards each other such that there is a treat of potential collision, and ignores superfluous notification signals if they are far apart or traveling away from one another. In other embodiments, participant 90 can use one of its self-reported notification signals to communicate to other participants within line of sight to increase its update rate, if needed.

FIG. 3B illustrates an example 70B of a second participant 94 coming within line-of-sight of the first participant 90 while the first participant 90 is transmitting directional notification signals 92.

As shown in FIG. 3B, the notification signal 92d is transmitted away from the first participant 90. The second participant 94 receives the notification signal 92d. Based on the information in the notification signal 92, the second participant 94 updates the participant table. Likewise, the second participant 94 is also transmitting notification signals, not illustrated, that are being received by the first participant 94.

When the first participant 90 has a message or communication to transmit to the second participant 94, the first participant 90 utilizes the participant table to determine the location and movement of the second participant 94 relative to the location and movement of the first participant 90. The first participant 90 can then directionally transmit a signal, similar to the directional transmission of the notification signal 92d, to the second participant 94 with the message or communication. In general, notification signals are not directed towards a specific participant, but data transmission signals are directed towards a specific participant. In this way, the transmission power can be focused on a relatively narrow beamwidth rather than a non-directional broadcasted message, which improves power utilization and reduces the chance of interception by third parties.

Although not described in detail herein, the first participant 90 can receive an echo signal of the notification signal off the second participant 94 to determine a position of the second participant object 94. The first participant 90 can calculate the approximate distance the second participant 94 is away from the first participant 90 based on the time of flight from the transmission of the notification signal 92d to the receipt of the echo signal. This approximate distance is used to determine an approximate position 98 of the second participant 94.

Utilization of the echo signal from the notification signal can be helpful in identifying and tracking non-participants. Similarly, such independent determination of the approximate position of the second participant 94 may be utilized if a participant's equipment is malfunctioning and not transmitting notification signals or if the information in its notification signals is not accurate. Thus, this approximated position calculation can be compared to the location information in the notification signals to confirm that the information in the notification signals is accurate.

Although FIGS. 3A-3B illustrate directional transmissions, embodiments are not so limited. In other embodiments, notification signals or data signals, or both, may be transmitted using omni-directional transmissions.

Figure 4A:
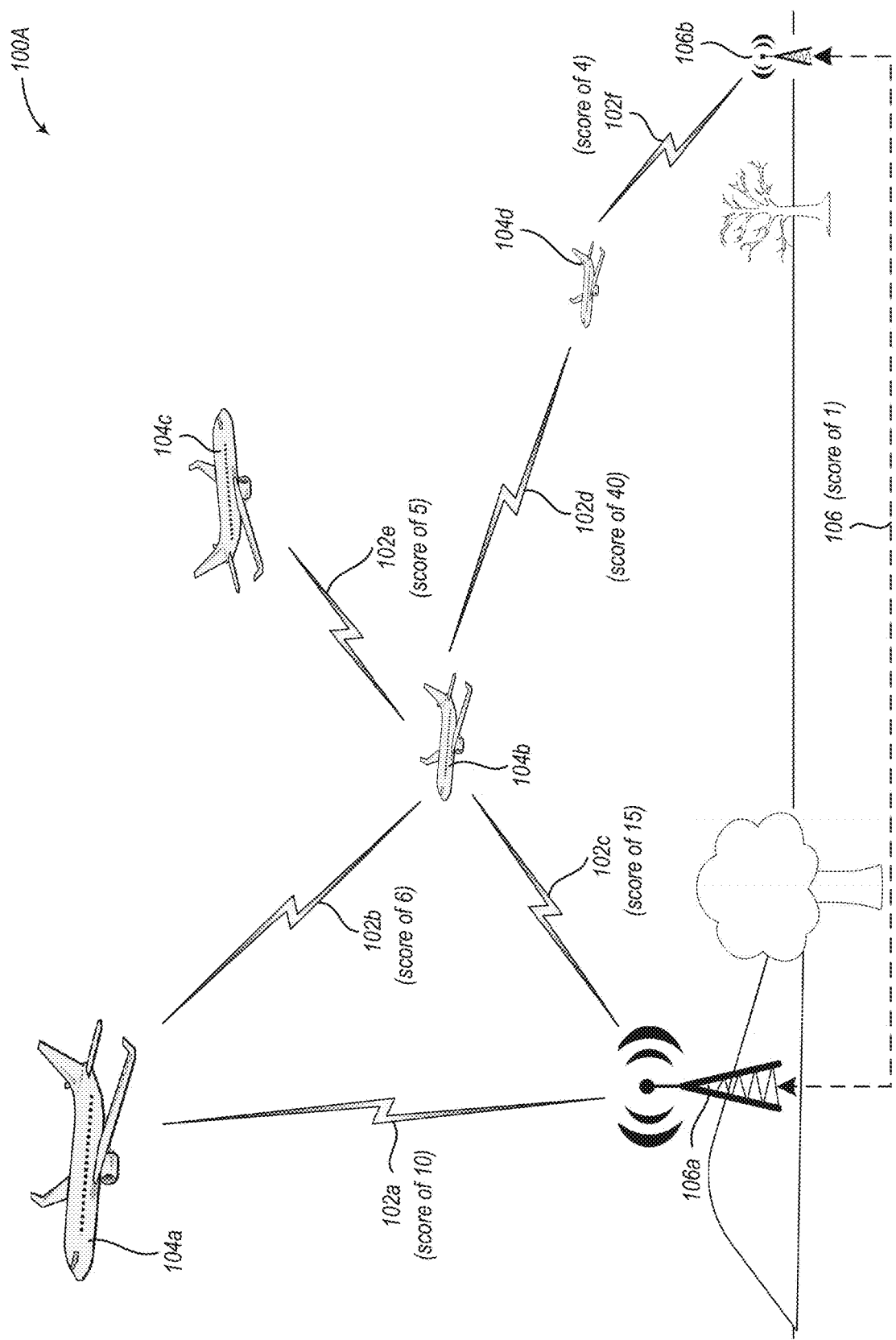
FIGS. 4A-4B illustrate context diagrams illustrating use-case examples of employing a cognitive heterogeneous ad hoc mesh network to transmit data in accordance with embodiments described herein.
Figure 4B:
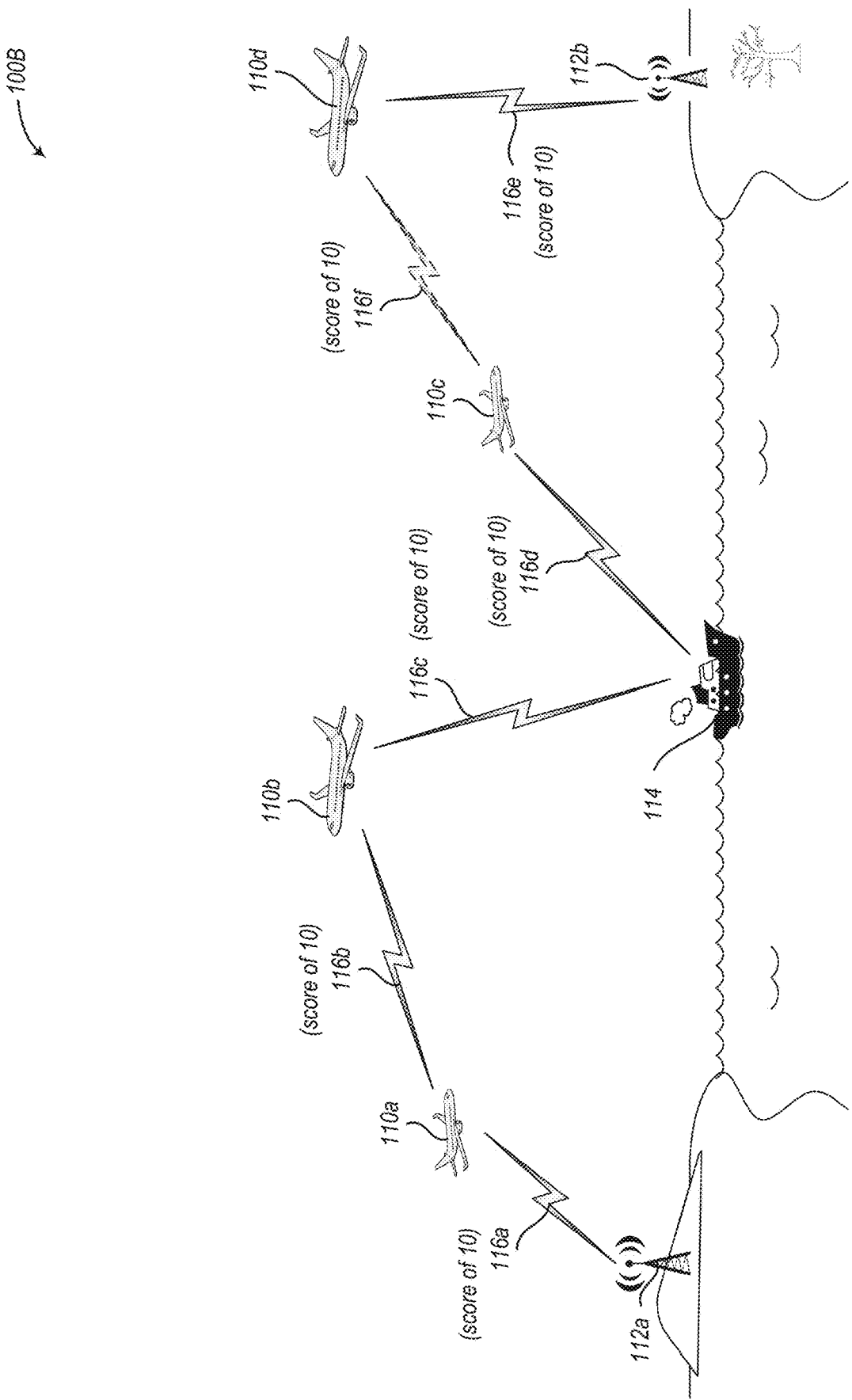

FIGS. 4A-4B illustrate context diagrams illustrating use-case examples of employing a cognitive heterogeneous ad hoc mesh network to transmit data in accordance with embodiments described herein. FIG. 4A illustrates example 100A of a plurality of airplanes 104a-104d and a plurality of towers 106a-106b. Airplanes 104a-104d are embodiments of mobile aerial participants 32 and towers 106a-106b are embodiments of stationary participants 34, as described herein.

In this illustration, assume airplane 104a is in line-of-sight communication with tower 106a via link 102a and in line-of-sight communication with airplane 104b via link 102b; assume airplane 104b is in line-of-sight communication with tower 106a via link 102c, in line-of-sight communication with airplane 104c via link 102e, and in line-of-sight communication with airplane 104d via link 102d; assume airplane 104d is also in line-of-sight communication with tower 106b via link 102f; and assume tower 106a and tower 106b communicate via wired connection or wired communication network, referred to as link 106. Each of these links is referred to as a participant pair and is identified as such in the participant table. The participant table also identifies one or more communication characteristics of each link 102a-102f, such as signal to noise ratio, quality of signal, spectrum capability, frequency capability, environmental conditions, and other characteristics.

Airplanes 104a-104d utilize their locally stored version of the participant table to transmit data or data requests along an optimum path of participants to a destination device. Destination devices can be grouped into two different categories (1) other participant devices or (2) non-participant computing devices. When the destination device is another participant, the optimum route is determined between the sending participant and the destination participant. But when the destination device is a non-participant device, then the optimum route is determined between the sending participant and a stationary participant, e.g., a ground participant, which can access the Internet or other non-participant network to communicate with the non-participant computing device. This stationary participant may be considered as the destination participant in determining the optimum route.

In various embodiments, the optimum route is identified from a plurality of different possible routes in which communications can be forwarded between the sending participant and the destination participant. Each route between the sending participant and the destination participant includes one or more participant pairs, with one participant sending the communication to another participant along the route. The sending participant calculates a total score for each possible route between the sending participant and the destination participant. The route with the lowest total score is determined to be the optimum route. In some embodiments, high scores may also be used to indicate the optimum route.

The total score for each possible route is determined based on a combination of individual scores for each participant pair along the possible route. The individual score for a participant pair is based on a weighted combination of a plurality of communication criteria or characteristics between the participants of the pair, including, but not limited to, physical distance, latency, data throughput, kinematic information of each pair participant relative to one another (e.g., if the pair participants are traveling away from each other and will be out of line-of-sight communication before the communication is fully sent from one participant to the other), signal to noise ratio, quality of signal, spectrum capability, frequency capability, environmental conditions, and other characteristics. A weighted value may be associated with one or more of these criteria based on the type of communication being sent (e.g., safety information, general user data, pilot or driver communications, etc.), the capabilities of the participants, the amount of data being sent, or other factors.

In some embodiments, some routes may be removed as possible routes based on various threshold criteria being exceeded. For example, if the number of hops between the sending participant and the destination participant exceeds a predetermined number of hops, then that route is removed as a possible route. As another example, if the number of hops between the sending participant and the destination participant exceeds a predetermined number of hops when the physical distance between the sending participant and the destination participant is below a predetermined threshold, then this route may be removed as a possible route. In this way, various criteria may be utilized to reduce the number of routes to a subset of routes that have the highest potential for being an optimum route.

In the illustrated example of FIG. 4A, assume participant airplane 104c is attempting to communicate with participant airplane 104d. The airplane 104c calculates the total score for one or a plurality of routes between the airplane 104c and the airplane 104d to determine a next participant along an optimum route in which to forward communications to the airplane 104d.

In this illustration, there are three paths for forwarding communications from airplane 104c to airplane 104d: route_1 may be airplane 104c to airplane 104b to airplane 104d via links 102e and 102d, route_2 may be airplane 104c to airplane 104b to tower 106a to tower 106b to airplane 104d via links 102e, 102c, 106, and 102f; and route_3 may be airplane 104c to airplane 104b to airplane 104a to tower 106a to tower 106b to airplane 104d via links 102e, 102b, 102a, 106, and 102f.

As mentioned above, the total score for each route is based on a combination of individual scores for each participant pair along the path. In this example, assume link 102a has an individual score of 10, link 102b has an individual score of 6, link 102c has an individual score of 15, link 102d has an individual score of 5, link 102e has an individual score of 40, 102f has an individual score of 4, and link 106 has an individual score of 1. Thus, route_1 would have a total combined score of 45 (5+40), route_2 would have a total combined score of 25 (5+15+1+4), and route_3 would have a total combined score of 26 (5+6+10+1+4). In this example, assume lower scores indicate a better connection than higher scores.

Because route_2 has the lowest score, airplane 104c would select route_2 as the optimum route for transmitted communications to airplane 104d, even though there are fewer hops via route_1. As a result, airplane 104c would identify that airplane 104c is the next participant along route_2 and would send communication messages destined for airplane 104d to airplane 104b via communication link 102e.

Because conditions and link characteristics are dynamic and can change and mobile participants may be constantly moving relative to one another and to stationary participants, each participant along a route that receives communications that are destined for another participant utilizes the participant table to identify an optimum route from itself to the destination participant, such that the participant can select and transmit the data to a next participant along its optimum route.

In this illustration, airplane 104b receives the communication from airplane 104c and performs embodiments similar to airplane 104c, which includes utilizing the participant table to determine an optimum route for forwarding the communication. For example, the airplane 104b may determine route_4 to be airplane 104b to tower 106a to tower 106b to airplane 104d via links 102c, 106, and 102f; and route_5 may be airplane 104b to airplane 104a to tower 106a to tower 106b to airplane 104d via links 102b, 102a, 106, and 102f. Assuming there is no change in the individual scores of the various participant pairs, route_5 would have a total combined score of 20 (15+1+4) and route_5 would have a total combined score of 21 (6+10+1+4). Therefore, airplane 104b may determine that route_4 is the optimum route for transmitting the communication to airplane 104d. As a result, airplane 104b transmits the communication destined for airplane 104d to tower 106a via link 102c. Tower 106a would then perform embodiments similar to airplane 104c and 104b to transmit the communication to tower 106b, which performs similar embodiments to transmit the communication to airplane 104b.

In some embodiments, stationary participants may prioritize routes that have a next participant as another stationary participant, which can reduce the amount of forwarding being performed by the mobile participants. Similarly, mobile participants may prioritize routes that have a next participant as a stationary participant, which can likewise reduce the amount of forwarding being performed by the mobile participants. Moreover, in some embodiments, mobile participants may prioritize direct line-of-sight communications rather than utilizing other routes with multiple participants to forward the communications, even if the direct line-of-sight communication has a higher, or worse, score than the multi-hop route.

If the characteristics of link 102d improve, e.g., airplane 104d and 104b become closer together and their throughput and quality of service improves, then airplane 104b may change its optimum route and transmit the communication directly to airplane 104d via link 102d. Likewise, if airplane 104c comes within line-of-sight communication of airplane 104d, not illustrated, then airplane 104c may determine that the optimum route is directly to airplane 104d without the use of other participants.

Moreover, if multiple routes are possible, then the participant, such as airplane 104b may transmit separate communications via the multiple routes so that it can utilize an aggregated bandwidth of multiple different participants. For instance, cargo aircraft typically have little passenger traffic; therefore, their bandwidth may be utilized by other aircraft within line-of-sight, making it additive. Similarly, stationary participants, such as tower 106a may employ various load managing techniques to share bandwidth and throughput between a variety of different mobile or stationary participants. Thus, even if there is an optimum route in which to forward a communication, the stationary participant can select another participant if the next participant in the optimum route is overloaded.

FIG. 4B illustrates example 100B, which is an alternative use case of example 100A shown in FIG. 4A. In this illustration, example 100B includes a plurality of airplanes 110a-110d, a plurality of towers 112a-112b, and a mobile ground participant boat 114. Airplanes 110a-110d may be similar to airplanes 104a-104d in FIG. 4A and towers 112a-112b may be similar to towers 106a-106b in FIG. 4A.

In the illustration in FIG. 4B, assume airplane 110a is attempting to communicate with airplane 110c and that airplane 110c and airplane 110d are flying towards each other and that they will be in line-of-sight communication, but are not yet in line-of-sight communication.

As discussed above, airplane 110a determines an optimum route and a next participant along that route to transmit the communications towards airplane 110c. In this example, airplane 110a transmits the communication to airplane 110b via link 116b, airplane 110b transmits the communication to boat 114 via link 116c, and boat 114 transmits the communication to airplane 110c via link 116d.

As described herein, mobile participants are periodically or continuously transmitting notification signals to inform other participants of their location. In the illustrated example, when airplane 110c comes within line-of-sight communication of airplane 110d, airplane 110d will receive a notification signal from airplane 110c via link 116f. Airplane 110d updates its participant table to indicate that airplane 110c is now in line-of-sight communication with airplane 110d. Airplane 110d also adds various information about link 116f in the participant table, such as quality of signal, signal to noise ratio, spectrum capability, frequency capability, etc.

Airplane 110d also determines if it is to be responsible for forwarding participant table updates to airplane 110c by determining if airplane 110c has an optimum route to a stationary participant via airplane 110d (where airplane 110d is the first hop from airplane 110c) or via some other route independent of airplane 110d. In various embodiments, airplane 110d utilizes the total score of the various routes similar to what is described above.

In this example, assume links 116a-116f, i.e., each participant pair, has an independent score of 10. Airplane 110d determines a first route and a total score from airplane 110c through airplane 110d to a stationary participant, e.g., tower 112b. In this case, the score of this first route via airplane 110d is 20. The airplane 110d then determines a route and total score from airplane 110c to a stationary participant without utilizing airplane 110d. In this case, the score of this second route independent of airplane 110d is 40.

If the route independent of airplane 110d has a lower, or better, score than the route via airplane 110d, then airplane 110d is not responsible for forwarding participant table updates to airplane 110c. If, on the other hand, the route via airplane 110d has a lower, or better, score than the route independent of airplane 110d, then airplane 110d is responsible for forwarding participant table updates to airplane 110c.

In this case, the route from airplane 110c via airplane 110d to tower 112b is optimal compared to the route from airplane 110c to tower 112a via boat 114, airplane 110b, and airplane 110a. Airplane 110d then updates the participant table to include a forward flag identifying its responsibility to forward participant table updates to airplane 110c. Airplane 110d transmits a copy of its updated participant table to airplane 110c.

Airplane 110d also transmits the received notification signal from airplane 110c and the forward flag along with its next notification signal or group of notification signals. If airplane 110d receives additional notification signals from other participants and it responsible for forwarding participant table updates to those other participants as well, then airplane's 110d notification signal likewise includes the information from these additional notification signals. In some embodiments, airplane 110d includes the additional information from other participant notification signals and the corresponding forward flags with a threshold number of notification signals from airplane 110d or for a predetermined amount of time. In this way, participants can propagate changes in the network until they reach a stationary participant that can update and retransmit the participant table.

In this scenario, tower 112b receives the notification signal from airplane 110d, including the additional information from the notification signal from airplane 110c and the forward flag. The tower 112b updates the participant table and transmits the updated participant table to participants that are within line-of-sight communication of the tower 112b. Whenever airplane 110d receives an update to its participant table, such as an update from stationary participant 112b or another participant, it forwards the update to airplane 110c.

Airplane 110d periodically or at predetermined times or for each notification signal recalculates the optimum route from airplane 110c to a stationary participant. If at any point airplane 110c has a better route to a stationary participant, such as if airplane 110c come within line-of-sight communication of tower 112b, then airplane 110c removes the forward flag from the participant table and no longer forwards participant table updates to airplane 110c.

Each participant may store the entire participant table or only a portion of the participant table. For example, stationary participants may store the entire participant table, whereas mobile participants may only store a portion, but not all, of the participant table. The portion of the participant table that a mobile participant is to store may include those participants that are within some predetermined threshold criteria away from the mobile participant. For example, a mobile participant may store a participant table for all participants within a predetermined distance of the mobile participant, which might be dependent on the type of mobile participant. For example, an airplane may maintain a participant table for all participants within a 50 mile radius, but a user computer device may maintain a participant table for all participants within 1 mile. As another example, the portion of the participant table maintained by a participant may be based on the number of hops, e.g., seven hops. Thus, the size of the participant table stored by a particular participant may be based on whether that participant is mobile or stationary or whether it is a tier 1, tier 2, or tier 3 participant.

As described in more detail herein, mobile participants can receive participant table updates directly from a stationary participant or from another mobile participant if the mobile participant is not within line-of-sight communication of a stationary participant. In some embodiments, stationary participants may provide the participant table to all participants that are within line of sight of the stationary participant at predetermined intervals or when a threshold number of changes have occurred to the participant table. In various embodiments, stationary participants receive specific updates to the participant table based on self-reporting messages sent by each mobile participant.

FIG. 5 illustrates an example participant table 120 that tracks participants in the cognitive heterogeneous ad hoc mesh network in accordance with embodiments described herein. Participant table 120 includes individual participant information 122 and line-of-sight participant information 124.

The individual participant information 122 separately identifies multiple participants 126a-126e. For each participant 126, the individual participant information 122 includes an identifier 128 for the corresponding participant 126, a current location 129 of the corresponding participant 126, kinematic information 130 of the corresponding participant 126, spectrum capabilities 131 of the corresponding participant 126, and a timestamp 132 indicating the time at which the information for the corresponding participant 126 was determined. The individual participant information 122 may also include other information, not shown, such as radio or processing capabilities of the corresponding participant, security protocols or encryption information, system limitations, or other information.

The line-of-sight participant information 124 lists those participants that are within line-of-sight communication of participants 126a-126e, which establishes each participant pair in the participant table 120. For example, corresponding line-of-sight participants 148a-148c are in line of sight of participant 126a.

The line-of-sight participant information 122 includes an identifier 134 for each corresponding line-of-sight participant 148, a quality of signal 136 for the notification signal sent by the corresponding line-of-sight participant 148 that was received by the corresponding participant 126, frequency 138 and spectrum 140 capabilities of each corresponding line-of-sight participant 148, and a signal to noise ratio 142 between the corresponding line-of-sight participant 148 and the corresponding participant 126.

In some embodiments, the line-of-sight participant information 124 also includes the weighted value 144 between each corresponding participant pair. The weighted value 144 is the individual score for that corresponding participant pair, which is based on a weighted combination of the distance between the pair participants (e.g., based on the difference between the location 129 of each participant in the pair), latency in transmissions between the pair participants, movement of the participants relative to one another (e.g., based on the difference between the kinematic information 130 of each participant in the pair), quality of signal 136 between the pair participants, frequency 138 and spectrum 140 capabilities between the pair participants (e.g., based on the spectrum capabilities 131), the signal to noise ratio 142, whether the timestamp 132 is outdated or beyond some threshold amount of time in the past, or other information, or any combination thereof. In various embodiments, the latency and distance may be factors of one another. For example, distance may be a factor of latency because a total latency of a transmission is based on a processing time to transmit a communication, a flight time of the transmission (based on the distance between the participants and the speed at which radio waves propagate through the air), and a processing time to receive the communication.

Each of these types of information may be provided an initial score (e.g., if two airplanes are within 200 miles of each other then it may have a better, lower score than two airplanes 2 miles apart), which may be based on one or more thresholds or may be actual values. Each type of information is then weighted based on various factors that can impact the communication between the participant pairs. For example, in some situations, quality of signal may be more important and weighted higher than distance, but kinematic information may be more important and weighted higher than quality of signal (e.g., due to the potential data loss issues from Doppler effect or the potential to be out of line-of-sight). Thus, each type of information may be weighted based on its importance relative to the other types of information such that more important information has a higher weight than lower important information.

In at least one embodiment, the individual score between a participant pair may be based on system limitations of one or both of the participants in the participant pair. For example, participant antennas can generally account for some amount of Doppler shift/effects. However, if the participants of a participant pair are traveling towards one another at a high enough rate of speed, then the antennas may not be able to account for the Doppler shift/effects, which may result in a reduction of quality of service, throughput, or dropped information. Such system limitations may impact the individual score, which can result in calculating a route to avoid participant pairs that currently have or may have system limitations. In at least one such embodiment, one or more thresholds may be employed such that as the Doppler shift/effect becomes worse, the individual score also gets worse (e.g., increases).

In some embodiments, system limitations may be included in the participant table or may be deduced from information within the participant table. In other embodiments, some of these system limitations may not be included in the participant table or may change based on movement of the participants, which can result in increased latency or re-routing the communication.

The participant table 120 also includes a forward flag 146 identifier, which indicates whether the corresponding participant 126 is responsible for forwarding the participant table 120 to the corresponding line-of-sight participant.

In various embodiments, each corresponding participant 126 updates its locally stored version of the participant table 120. Stationary participants can update the participant table 120 maintained by the stationary participants based on the information contained in the notification signal sent by the participants 126.

The operation of certain aspects will now be described with respect to FIGS. 6-9. In at least one of various embodiments, processes 150 described in conjunction with FIG. 6 may be implemented by or executed on one or more computing devices, such as mobile participants 36. Processes 180 and 200 described in conjunction with FIGS. 7 and 8A-8B, respectively, may be implemented by or executed on one or more computing devices, such as mobile participants 36 or stationary participants 34.

Figure 6:
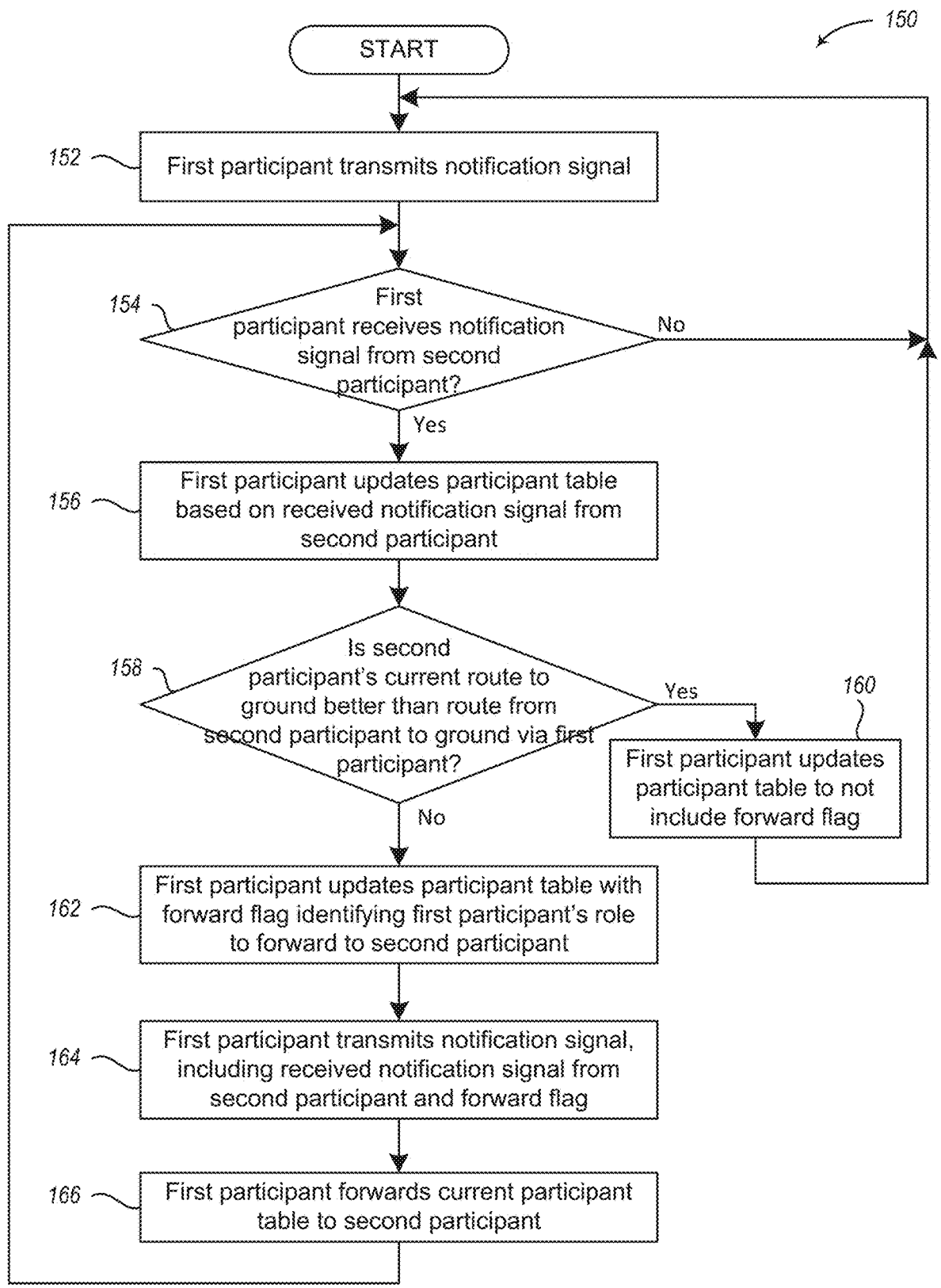
FIG. 6 illustrates a logical flow diagram showing one embodiment of an overview process for a mobile participant to transmit and receive notification signals to manage the participant table of a cognitive heterogeneous ad hoc mesh network in accordance with embodiments described herein.

FIG. 6 illustrates a logical flow diagram showing one embodiment of an overview process for a mobile participant to transmit and receive notification signals to manage the participant table of a cognitive heterogeneous ad hoc mesh network in accordance with embodiments described herein.

Process 150 begins, after a start block, at block 152, where a first mobile participant transmits a notification signal. In various embodiments, the first participant transmits the notification signal at a predetermined rate, periodically, at predetermined times, or based on various operating characteristics of the first participant. The rate at which notification signals are transmitted may be static or dynamic and may change based on the distance and rate of closure between other participants or the number of other participants within line-of-sight of the first participant.

Process 150 proceeds to decision block 154, where the first participant receives a notification signal from a second participant. In various embodiments, the first participant may process each notification signal sent by the second participant and received by the first participant. In other embodiments, the first participant may process a subset of the notification signals received from the second participant. If the first participant has received a notification signal from the second participant and the first participant is to process the notification signal, then process 150 flows to block 156; otherwise process 150 returns to block 152 to continue sending its notification signals and waiting for notification signal from other participants.

At block 156, the first participant updates its local version of the participant table based on the information in the received notification signal from the second participant. If the second participant is not in the participant table as being within line-of-sight communication of the first participant, the first participant adds the second participant to the participant table indicating that the first and second participants are within line-of-sight communication of one another, as a participant pair. If the second participant is already listed in the participant table, the first participant updates the participant table with the information from the received notification signal, such as the current location and kinematic information from the second participant. In some embodiments, the first participant updates the participant table to include additional information regarding the communication with the second participant, such as the quality of signal received from the second participant, signal to noise ratio, frequency or spectrum capabilities, etc.

Process 150 continues at block 158, where a determination is made whether the second participant's current route or path to a stationary ground participant is better than a route or path from the second participant to a stationary ground participant via the first participant. As discussed above, the first participant uses the participant table to determine an optimum route from the second participant to a stationary participant and determines if that optimum route is via the first participant or some other participant. If the second participants current route to a stationary participant independent of the first participant is better than a route from the second participant to a stationary participant via the first participant, then process 150 flows to block 160; otherwise, the first participant is responsible for forwarding participant table updates to the second participant and process 150 flows to block 162.

At block 162, the first participant updates the participant table to include a forward flag that indicates that the first participant is to forward participant table updates to the second participant.

Process 150 proceeds next to block 164, where the first participant transmits its notification and includes the received notification signal from the second participant and the forward flag. In an embodiment, the received notification signal, or information therefrom, is appended to the first participant's notification signal. In some embodiments, the received notification signal may also include notification signals from other participants. The first participant can update its participant table with information from these additional notification signals and may append these additional notification signals to the first participant's notification signal. In this way, changes to the participant table can be propagated to a stationary participant that updates the participant table for distribution to other participants.

In various embodiments, the first participant transmits this notification signal, along with the notification signal from the second participant or additional notification signals from other participants, at the next scheduled interval. As mentioned above, multiple directional notification signals may be transmitted to cover multiple different angles away from the first participant. In at least one such embodiment, the first participant transmits the combined notification signal during each transmission until at least one complete cycle of notification signals has been transmitted.

Process 150 continues next at block 166, where the first participant forwards the current participant table to the second participant. Since the first participant is responsible for forwarding participant table updates to the second participant, the first participant will also transmit additional participant table updates to the second participant when the first participant receives such updates from a stationary participant, whether directly or via another mobile participant. The first participant will continue to forward participant table updates to the second participant until the forward flag is removed from the participant table, either by first participant or by another participant that provides a more optimum route between the second participant to a stationary participant.

After block 166, process 150 returns to decision block 154 to continue to wait for additional notification signals from the second participant or from other participants and to continue to transmit its notification signals at block 152.

If, at decision block 158, the second participant's current route to a stationary participant is better than a route from the second participant to a stationary participant via the first participant, then the first participant updates the participant table to not include the forward flag. If the forward flag is in the participant table, then the first participant removes the forward flag. If the forward flag is not in the participant table, then the forward flag is ignored.

After block 160, process 150 returns to block 152 to continue sending notification signals and waiting for notification signal from other participants.

Figure 7:
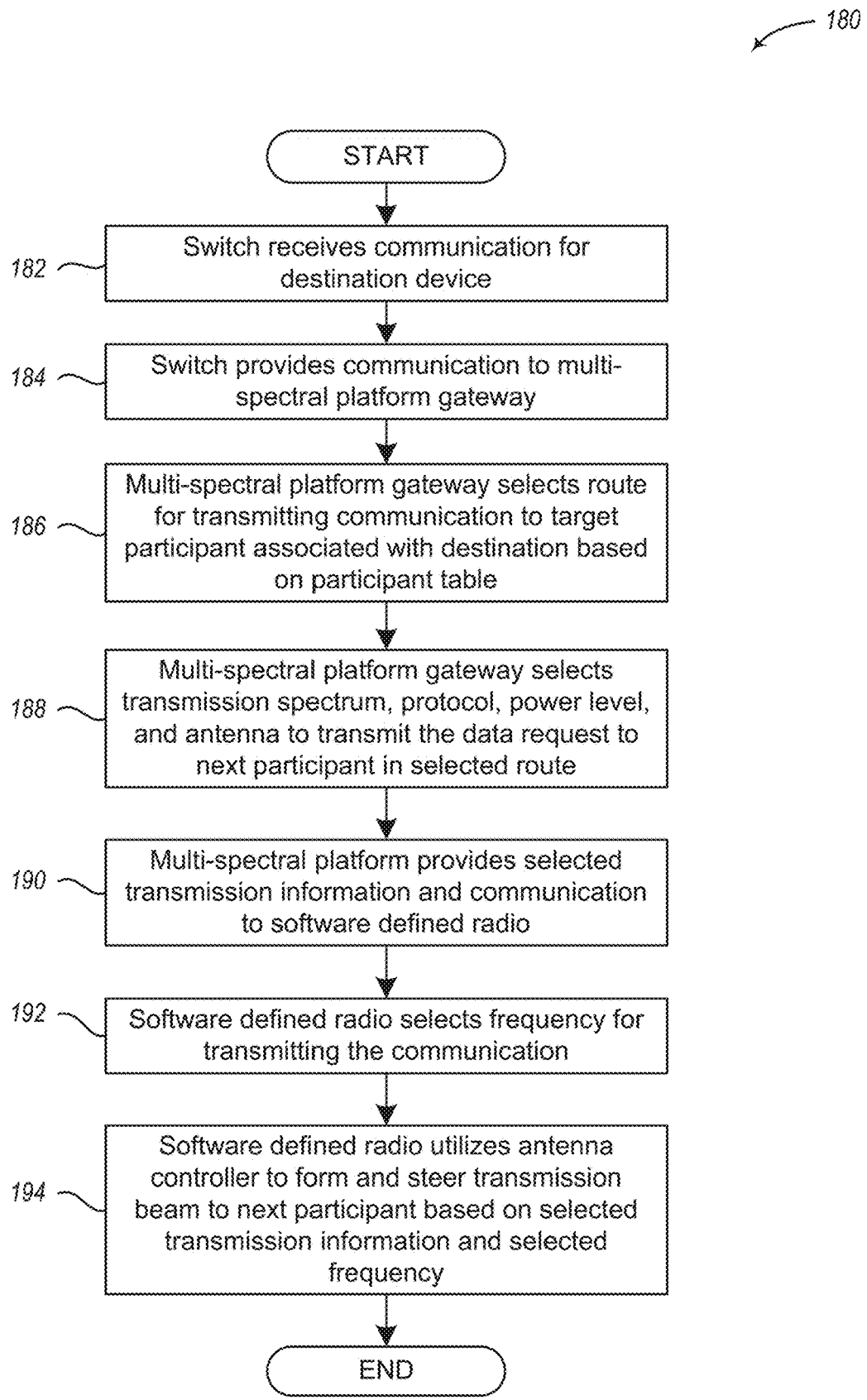
FIG. 7 illustrates a logical flow diagram showing one embodiment of a process for a participant to receive and transmit a communication to another participant in accordance with embodiments described herein.

FIG. 7 illustrates a logical flow diagram showing one embodiment of a process for a participant to receive and transmit a communication to another participant in accordance with embodiments described herein. In various embodiments, process 180 in FIG. 7 utilizes multiple different hardware components or devices to perform various actions of the mobile participant. In some embodiments, however, these actions may be performed by a single component or computing device or other combination of components or computing devices.

Process 180 begins, after a start block, at block 182 where a switch receives a communication for a destination computing device. In various embodiments, the communication is a request for data to be returned from the destination. In other embodiments, the communication includes data to be provided to the destination. Thus, the destination of the communication may be another participant, or it may be a non-participant computing device.

In some embodiments, the communication may be received from a user device that is in communication with an access point associated with the switch, such as a tier 1 mobile participant communication with an access point on a tier 2 or tier 3 mobile participant. In other embodiments, the communication may be received from a non-participant computing device via a non-participant network. One such example may be a stationary participant receiving data from a non-participant computing device in response to a previous data request being transmitted from the stationary participant to the non-participant computing device.

Process 180 proceeds to block 184, where the switch provides the communication to a multi-spectral platform gateway. In general, the switch manages multiple communications from multiple user devices and coordinates their delivery to the multi-spectral platform gateway.

Process 180 continues at block 186, where the multi-spectral platform gateway uses the participant table to select an optimum route for transmitting the communication to a target participant associated with the destination. As described above, the optimum route is determined from a plurality of routes based on a total combined score of individual participant pair scores of weighted values along the routes.

In various embodiments, the target participant may be the destination or it may be a participant that can access or communicate with the destination computing device. For example, if the destination is a non-participant computing device, then the target participant may be a stationary participant that can access or communicate with the destination via a non-participant network, e.g., the Internet. As another example, if the destination is a user device communicating with a particular participant (e.g., a tier 3 mobile aerial participant), then the target participant may be that particular participant that is communicating with the user device.

Process 180 proceeds next to block 188, where the multi-spectral platform gateway selects a transmission spectrum, protocol, power level, and antenna to transmit the communication to a next participant in the selected route. In various embodiments, the multi-spectral platform gateway uses the participant table to select these transmission parameters. For example, the power level is selected based on a distance between the participant and the next participant as well as the spectrum in which the participant chooses to transmit to the next participant.

In some embodiments, multi-spectral platform gateway may also obtain weather information or other environmental data to select the appropriate transmission information.

Process 180 continues next at block 190, where the multi-spectral platform gateway provides the selected transmission information and the communication to a software defined radio.

Process 180 proceeds to block 192, where the software defined radio selects the frequency for transmitting the communication. The software defined radio can employ dynamic spectrum access techniques to sense available frequency space available. In various embodiments, the software defined radio pass spectrum interference levels to the multi-spectral platform gateway so that the multi-spectral platform gateway can add spectrum limitations to the calculation of determining the appropriate route and transmission information.

Process 180 continues at block 194, where the software defined ratio utilizes an antenna controller to from and steer a transmission beam via the selected antenna chosen by the multi-spectral platform gateway to the next participant to transmit the communication based on the selected transmission information and the selected frequency.

After block 194, process 180 ends.

Figure 8A:
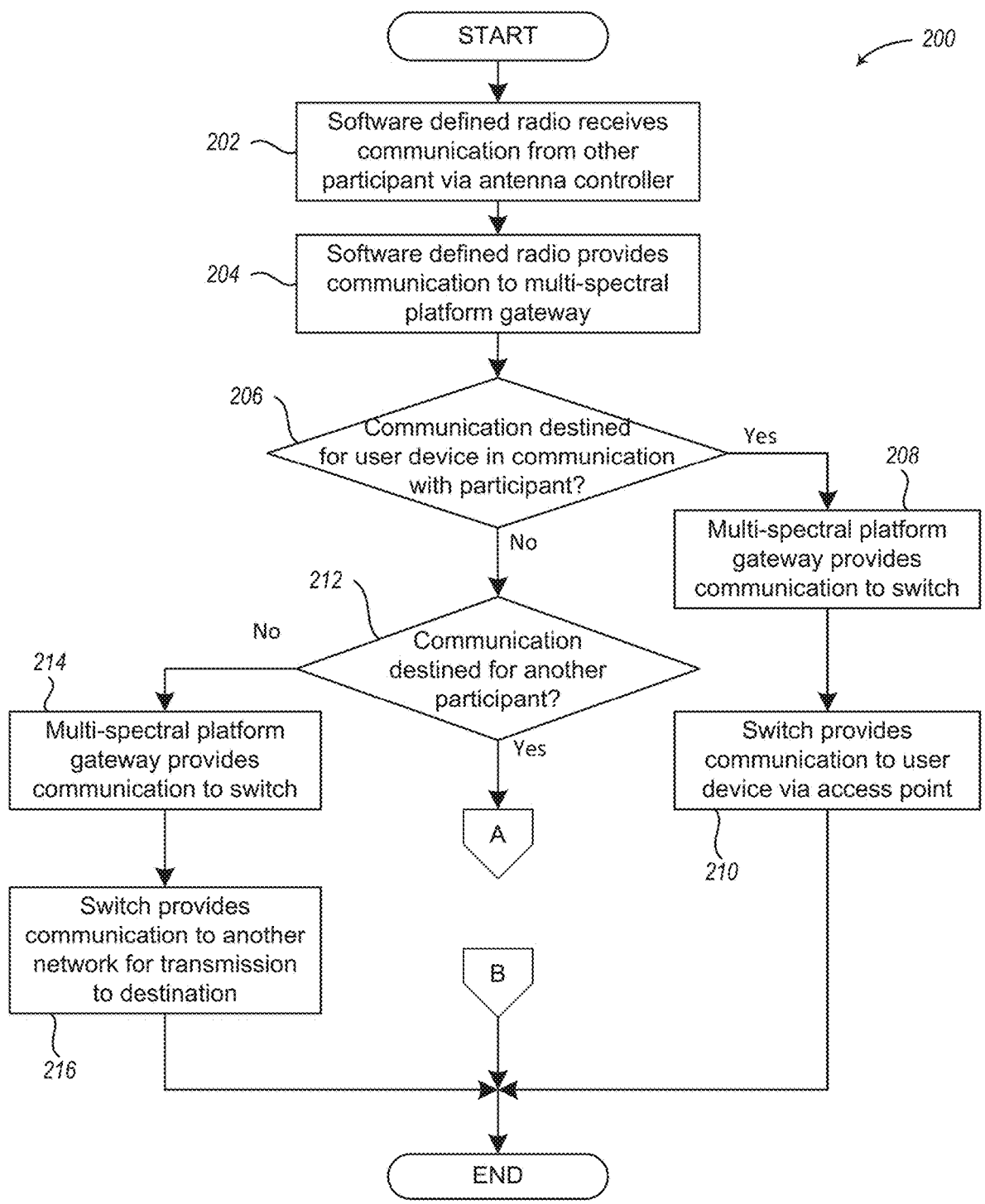
FIG. 8A-8B illustrates a logical flow diagram showing one embodiment of a process for a participant to receive and forward a communication in accordance with embodiments described herein.
Figure 8B:
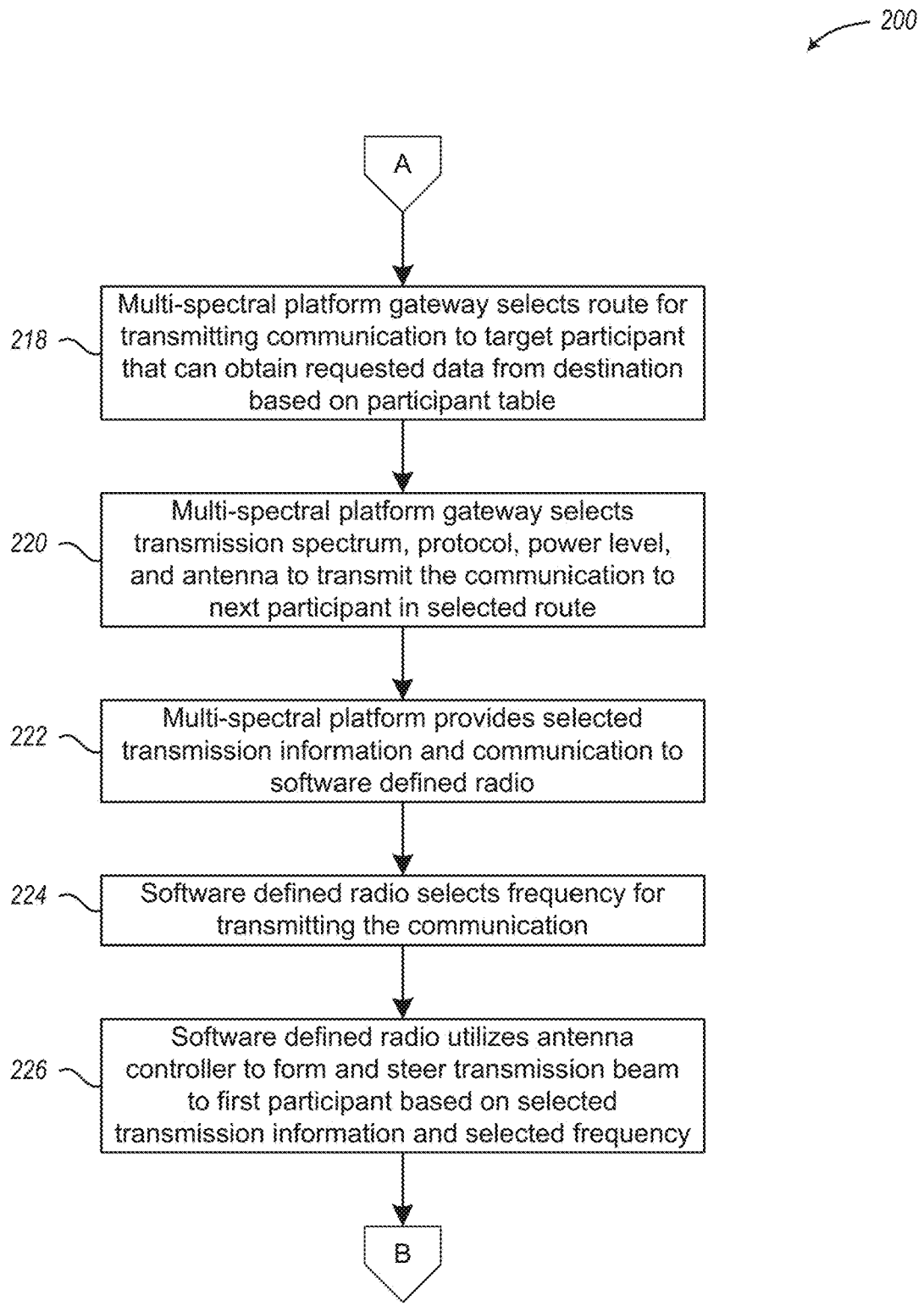

FIG. 8A-8B illustrates a logical flow diagram showing one embodiment of a process for a participant to receive and forward a communication in accordance with embodiments described herein. For example, the mobile participant performing the actions of process 200 may be the next participant described above in conjunction with process 180 in FIG. 7.

In various embodiments, process 200 in FIGS. 8A-8B utilizes multiple different hardware components or devices to perform various actions of the mobile participant. In some embodiments, however, these actions may be performed by a single component or computing device or other combination of components or computing devices.

Process 200 begins on FIG. 8A, after a start block, at block 202, where the software defined radio receives a communication from another participant via an antenna and antenna controller.

Process 200 proceeds to block 204, where the software defined radio provides the communication to the multi-spectral platform gateway to perform various actions.

Process 200 continues at decision block 206, where the multi-spectral platform gateway determines whether the communication is destined for a user device, e.g., a tier 1 mobile device, in communication with the participant. If the communication is destined for a user device in communication with the participant, then process 200 flows to block 208; otherwise, process 200 flows to decision block 212.

At block 208, the multi-spectral platform gateway provides the communication to the switch, and the switch provides the communication to the user device via an access point associated with the user device at block 210. In various embodiments, the multi-spectral platform gateway may also provide information to the server to be cached in case forwarded messages need to be resent or the information is subsequently requested. After block 210, process 200 ends.

If, at decision block 206, the communication is not destined for a user device in communication with the participant, then process 200 flows from decision block 206 to decision block 212. At decision block 212, the multi-spectral platform gateway determines whether the communication is destined from another participant or for a non-participant computing device. In various embodiments, the multi-spectral platform gateway makes this determination by determining if the participant is to forward the communication to another participant or if the participant has access to or is in communication with the destination or a non-participant network to forward the communication to the destination. If the communication is not destined for another participant, process 200 flows to block 214; otherwise, process 200 continues at block 218 on FIG. 8B.

At block 214, the multi-spectral platform gateway provides the communication to the switch, and the switch provides the communication to the destination or to another network for transmission to the destination at block 216. After block 210, process 200 ends.

If, at decision block 212, the multi-spectral platform gateway determines that the communication is destined for another participant, then process 200 flows from decision block 212 to block 218 on FIG. 8B. At block 218, the multi-spectral platform gateway uses the participant table to select an optimum route for transmitting the communication to a target participant that can obtain the communication from the destination. In various embodiments, the multi-spectral platform gateway performs embodiments similar to block 186 in FIG. 6.

Process 200 proceeds next to block 220, where the multi-spectral platform gateway selects a transmission spectrum, protocol, power level, and antenna to transmit the communication to a next participant in the selected route. In various embodiments, the multi-spectral platform gateway performs embodiments similar to block 188 in FIG. 6.

Process 200 continues next at block 222, where the multi-spectral platform gateway provides the selected transmission information and the communication to a software defined radio similar to block 190 in FIG. 6.

Process 200 proceeds to block 224, where the software defined radio selects the frequency for transmitting the communication similar to block 192 in FIG. 6.

Process 200 continues at block 226, where the software defined ratio utilizes an antenna controller to from and steer a transmission beam via the selected antenna to the next participant to transmit the communication based on the selected transmission information and the selected frequency similar to block 194 in FIG. 6.

After block 226, process 200 ends.

Figure 9:
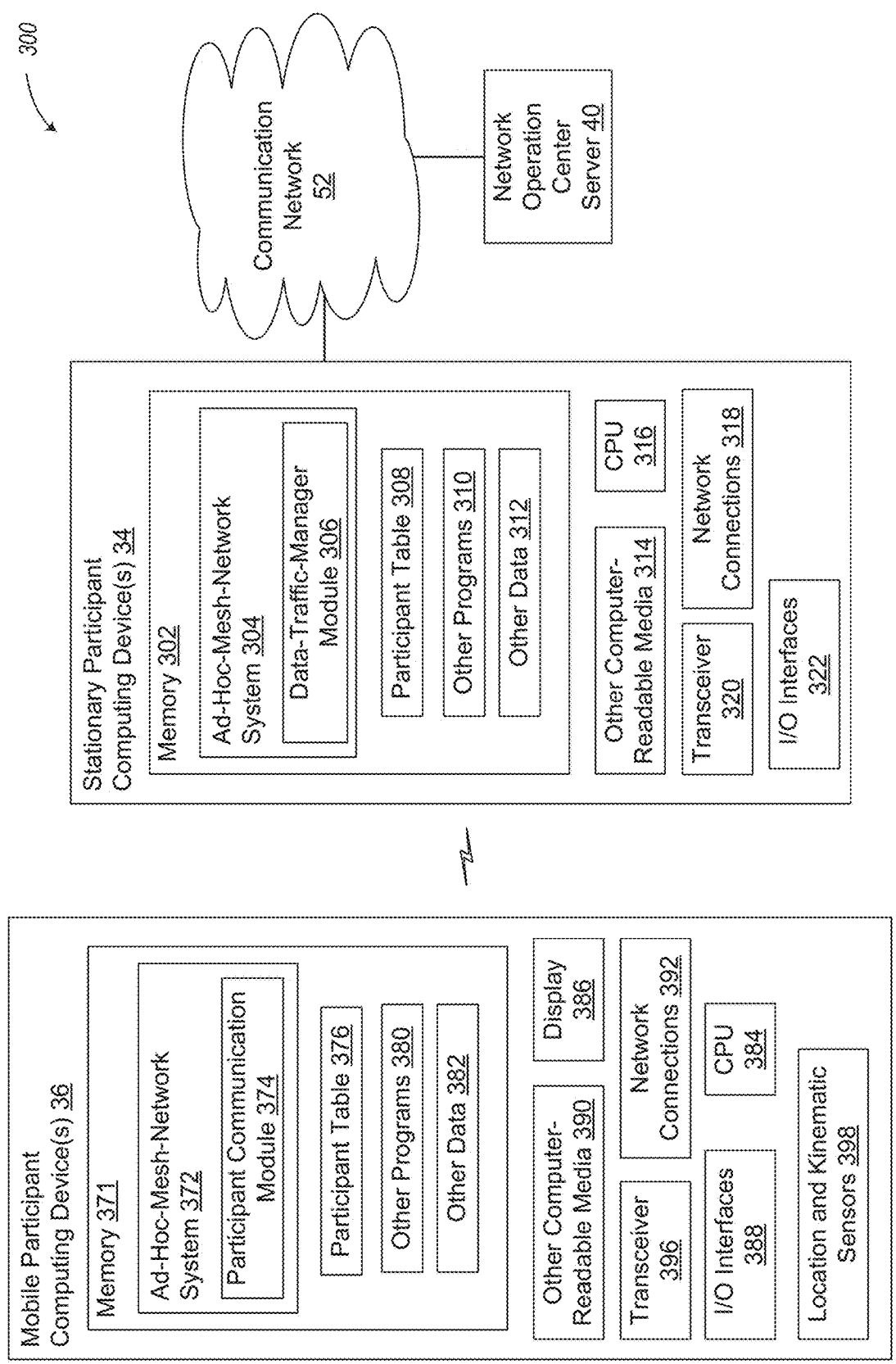
FIG. 9 shows a system diagram that describes one implementation of computing systems for implementing embodiments described herein.

FIG. 9 shows a system diagram that describes one implementation of computing systems for implementing embodiments described herein. System 300 includes mobile participant computing device(s) 36, stationary participant computing device(s) 34, and network operation center server 40.

Mobile participant computing device(s) 36 communicate with one or more other mobile participant computing devices 36 and stationary participant computing devices 34 via line-of-sight communications to transmit data and other communications among the participants. One or more special-purpose computing systems may be used to implement each mobile participant computing device 36. Accordingly, various embodiments described herein may be implemented in software, hardware, firmware, or in some combination thereof. A mobile participant computing device 34 may include memory 371, one or more central processing units (CPUs) 384, display 386, I/O interfaces 388, other computer-readable media 390, network connections 392, transceiver 396, and motion sensors or other sensors 398.

Memory 371 may include one or more various types of non-volatile and/or volatile storage technologies. Examples of memory 371 may include, but are not limited to, flash memory, hard disk drives, optical drives, solid-state drives, various types of random access memory (RAM), various types of read-only memory (ROM), other computer-readable storage media (also referred to as processor-readable storage media), or the like, or any combination thereof. Memory 371 may be utilized to store information, including computer-readable instructions that are utilized by CPU 384 to perform actions, including embodiments described herein.

Memory 371 may have stored thereon ad-hoc-mesh-network system 372, which includes participant communication module 374. The participant communication module 374 may employ embodiments described herein to send notification signals, track participants via participant table 376, and to generate and transfer data and communications to other participants.

The memory 371 also stores participant table 376. In various embodiments, this is a local version of the participant table generated by the mobile participant or received from a stationary participant 34 or other mobile participant 36. The participant table 376 may be a partial version or a complete version of the participant table 308 maintained by the stationary participants 34 or by mobile participants if stationary participants are unavailable.

The memory 371 may also store other programs 380 and other data 382. The other programs 380 may include user applications, other tracking or geo-positioning programs, etc. The other data 382 may include data or information regarding one or more non-participant objects or other information.

Network connections 392 are configured to communicate with other computing devices, such as other mobile participant computing devices 36 and stationary participant computing devices 34 via transceiver 396 and line-of-sight communications mechanisms and technologies. Transceiver 396 may be a omni-directional transceiver that sends and receives radio signals independent of direction, or transceiver 396 may be a directional transceiver that sends or receives, or both sends and receives, radio signals to or from a particular direction relative to the positioning of the mobile participant computing device 36.

Location and kinematic sensors 398 include one or more sensors that are used to determine the position of the mobile participant computing device 36 and the kinematic information of how the mobile participant computing device 36 is moving. Examples of location and kinematic data sensors 398 include, but are not limited to using participant's self-reported notifications calibrated off of stationary participants, processing the echo of own self-reported notifications, GPS modules, accelerometers, gyroscopes, or other sensors that can be used to determine the position and kinematic information of the mobile participant computing device 36.

Other I/O interfaces 388 may include a keyboard, audio interfaces, video interfaces, or the like. Other computer-readable media 390 may include other types of stationary or removable computer-readable media, such as removable flash drives, external hard drives, or the like. Display 386 is a display interface that is configured to output images, content, or information to a user. Examples of display 386 include, but are not limited to, LCD screens, LEDs or other lights, or other types of display devices.

Stationary participant computing device(s) 34 communicate with mobile participant computing devices 36 via line-of-sight communications and with other stationary participants either by wired or wireless communications to transmit information or data to other participants or to non-participants. One or more special-purpose computing systems may be used to implement each stationary participant computing device 34. Accordingly, various embodiments described herein may be implemented in software, hardware, firmware, or in some combination thereof. A stationary participant computing device 34 may include memory 302, one or more central processing units (CPUs) 316, I/O interfaces 322, other computer-readable media 314, network connections 318, and transceiver 320.

Memory 302 may include one or more various types of non-volatile and/or volatile storage technologies. Examples of memory 302 may include, but are not limited to, flash memory, hard disk drives, optical drives, solid-state drives, various types of random access memory (RAM), various types of read-only memory (ROM), other computer-readable storage media (also referred to as processor-readable storage media), or the like, or any combination thereof. Memory 302 may be utilized to store information, including computer-readable instructions that are utilized by CPU 316 to perform actions, including embodiments described herein.

Memory 302 may have stored thereon ad-hoc-mesh-network system 304, which includes data-traffic-manager module 306. The data-traffic-manager module 306 may employ embodiments described herein to transfer data from one participant to another participant and to manage and provide participant table updates. In various embodiments, data-traffic-manager module 306 may communicate with network operation center server 40 via communication network 52, such as to provide or receive participant table updates.

The memory 302 may also store participant table 308, other programs 310, and other data 312. The participant table 308 may be a full version of the participant table 308 or it may be a partial version based on those mobile participants 36 within line-of-sight of or a threshold number of hops from the stationary participant 34. The other data 312 may include data or information regarding one or more tracked objects or other information.

Network connections 318 are configured to communicate with other computing devices, such as other stationary participant computing devices 34 and mobile participant computing devices 36 via transceiver 320 and wired or line-of-sight communications mechanisms and technologies. Network connections 318 are also configured to communicate with the network operation center server 40 via communication network 52.

Transceiver 320 may be a omni-directional transceiver that sends and receives radio signals independent of direction, or transceiver 320 may be a directional transceiver that sends or receives, or both sends and receives, radio signals to or from a particular direction relative to the position of the stationary participant computing device 34.

Other I/O interfaces 314 may include a keyboard, audio interfaces, video interfaces, or the like. Other computer-readable media 314 may include other types of stationary or removable computer-readable media, such as removable flash drives, external hard drives, or the like.

Network operation center server 40 includes one or more computing devices that store information about the positioning of mobile participant computing devices 36 and stationary participant computing devices 34, such as a master participant table. The network operation center server 40 may also store information regarding the positioning and movement of non-participant objects that are reported to it by the mobile participant computing devices 36 or the stationary participant computing devices 34. The network operation center server 40 also includes memory, one or more processors, network interfaces and connections, and other computing components similar to mobile participant computing devices 36 and stationary participant computing devices 34, but those components are not shown here for ease of illustration.

Communication network 52 may include one or more wired or wireless communication networks to transmit data between one stationary participant computing device 34 and another stationary participant computing device 34 or with the network operation center server 40.

Figure 10:
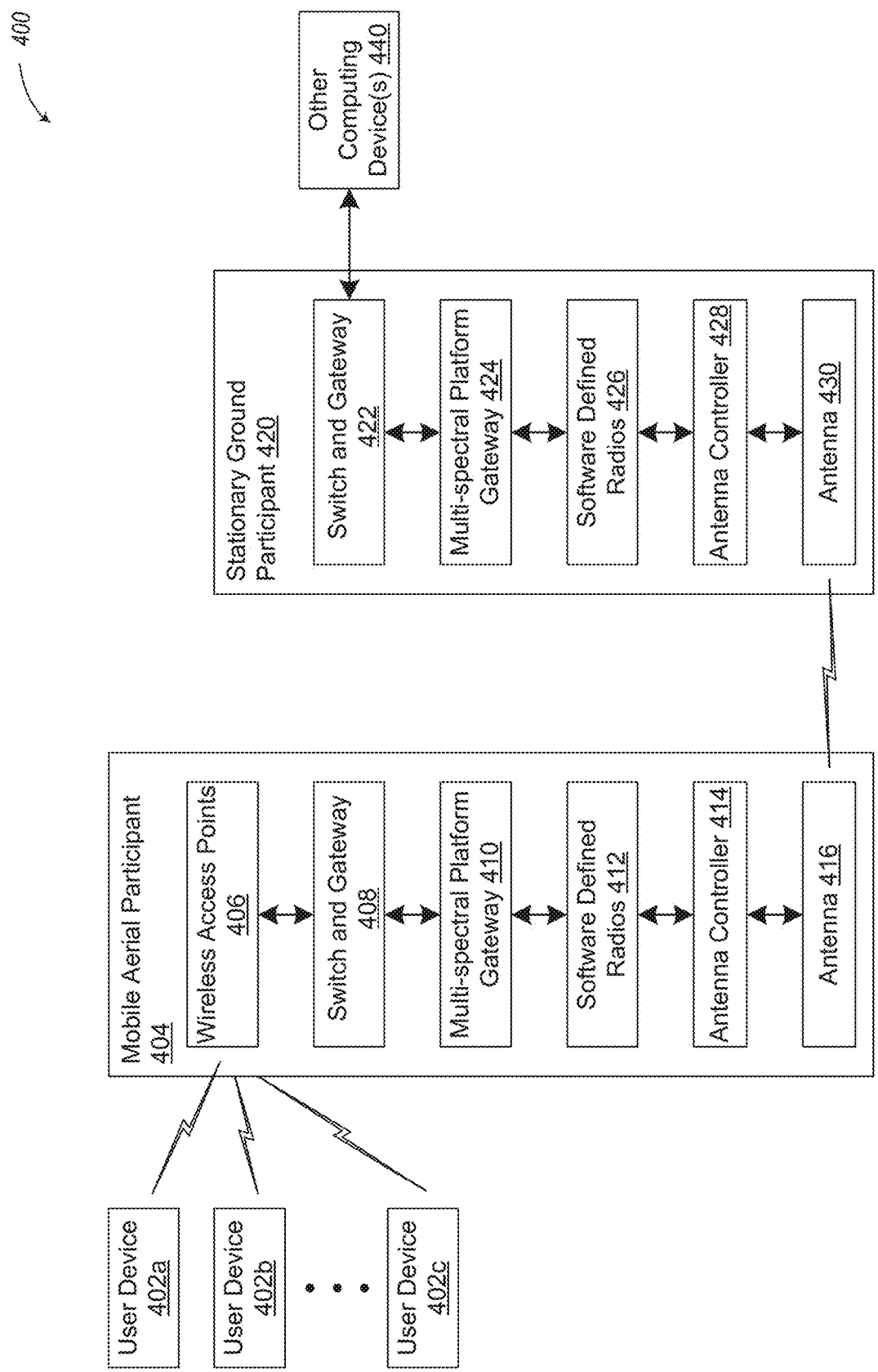
FIG. 10 shows a system diagram that describes another implementation of computing systems for implementing embodiments described herein.

FIG. 10 shows a system diagram that describes another implementation of computing systems for implementing embodiments described herein. System 400 includes user devices 402a-402c that are in wireless line-of-sight communication with mobile aerial participant 404, which is in wireless line-of-sight communication with stationary ground participant 420, which is in wired communication with other computing device 440. As described above, user devices 402a-402c may be tier 1 mobile participants in communication with a tier 3 mobile aerial participant or some other mobile participant. Mobile aerial participant 404 may be an embodiment of a mobile aerial participant 32 and stationary ground participant 420 may be an embodiment of a stationary participant 34 discussed above.

Mobile aerial participant 404 includes one or more wireless access points 406 to communicate with user devices 402a-402c. Switch and gateway 408 coordinates and handles communications between the wireless access points 406 and a multi-spectral platform gateway 410. The multi-spectral platform gateway 410 performs embodiments described herein to update the participant table and to select an optimum route, spectrum and antenna to transmit communications from the mobile aerial participant 404. The multi-spectral platform gateway 410 also selects many transmission characteristics based on information in the participant table and provides them to one or more software defined radios 412. The software defined radios 412 select the frequency from the multi-spectral platform gateway selected spectrum at which to transmit communication from the mobile aerial participant 404. The antenna controller 414 form and steer a transmission beam via antenna 416 based on the selected transmission information, the selected frequency, and the multi-spectral platform gateway provided location of intended recipient. This transmission may be directed to another mobile aerial participant 404, another type of mobile participant, or to the stationary ground participant 420.

In some embodiments, the mobile aerial participant 404 may store or cache a threshold amount of data received from or provided to the user devices 402a-402c. The data may be cached for a threshold amount of time or storage space. In this way, if a user device subsequently requests the same data that was already obtained for another user device, such as a movie or other in-flight entertainment, then the mobile aerial participant 404 can provide the cached data to the user device without having to transmit additional communications to other participants to obtain the data. In some embodiments, forwarding participants may also cache data for a predetermined amount of time, which can act as a backup incase the forwarded communication was not successfully received or if the forwarding participant has to select another route to transmit the communication. In yet other embodiments, the cached data can be used to answer a request from another participant so that they do not have to request the information from a stationary participant, which can alleviate wasted network usage by transferring data that has already been transferred from the internet or other source previously.

Stationary ground participant 420 receives the transmission from the mobile aerial participant 404 at an antenna controller 428 via antenna 430 and provides the received signals to a software defined radio 426. The software defined radio 426 provides the received communications to a multi-spectral platform gateway 424, which determines whether the communication should be transmitted to a next participant, such as another mobile aerial participant 404, some other mobile participant, or to another stationary ground participant 420 via a wired network, or whether the communication is to be provided to other computing devices 440. If the communication is to be transmitted to another mobile aerial participant or another mobile participant via line-of-sight communications, then the stationary ground participant 420 utilizes the multi-spectral platform gateway 424, the software defined radios 426, the antenna controller 428, and the antenna 420 in a manner similar to mobile aerial participant 404 to directionally transmit the communication to a next participant. If the communication is destined for some other non-participant computing device, then the multi-spectral platform gateway 424 provides the communication to switch and gateway 422 for transmission via a wired communication network to other computing devices 440.

If the communication was for data or information from the other computing devices 440, then the other computing devices 440 may answer a request and return data or information to the stationary ground participant 420 for transmission to the mobile aerial participant 404 and then to the requesting user device 402 in a somewhat reverse fashion than what is described above.

One non-limiting non-exhaustive example of components utilized by the mobile aerial participant 404 may include, but is not limited to: a conformal and non-conformal electronically steered antenna array, cabling appropriate for array and radio communication, cognitive radio suites that both receive and transmit in pairs suitable to service the entirety of the participant max capacity, cabling appropriate for radio to host platform communication, cabling from host platform to server and in-flight entertainment suite, onboard server with up to 10 TB of storage, onboard cognitive modems and routers with public address capability, cognitive equipment power supplies, cognitive radio transmission amplifier and power supply, and onboard firewall.

One non-limiting non-exhaustive example of components utilized by the mobile aerial participant 404 may include, but is not limited to: an adaptive power backup generator, cognitive multi-spectral antennas x 6, 42U rack, rack mounted server, integrated processor chip, SSL & VPN appliance, external firewall appliance, internal firewall appliance, load management appliance, web filter appliance, multi-spectral cognitive Radio x 4, High throughput router, smart power strip/UPS, mesh network Wi-Fi appliances, small mesh network home appliances, wireless access points with public address appliances, and backhaul connectivity.

In various embodiments, communications between participants may include one or multi-level security. For example, in some embodiments, all transmission via the participant network may employ a first encryption or security mechanism. Some communications between participants may further include another layer of security. For example, a user may have a cell phone and a home network. The cell phone may be a mobile participant and a router on the home network may be a participant access node. The home network may be protected by Wired Equivalent Privacy (WEP), Wi-Fi Protected Access (WPA), Wi-FI Protected Access II (WPA2), or other security mechanism. In this example, the cell phone participant may first encrypt communications via the same security mechanism as the home network and then encrypt the communications using the network encryption. The cell phone participant employs embodiments described herein to route the encrypted communications to the router participant, which can decrypt the communication using the network encryption mechanism and then the home network security mechanism. Even additional layers of encryption and security can be employed for a group of users or devices, subsets of users in the group, individuals in those subsets, etc.

The various embodiments described above can be combined to provide further embodiments. These and other changes can be made to the embodiments in light of the above-detailed description. Moreover, additional details and use case examples are provided in the U.S. patents, U.S. patent application publications, U.S. patent applications, foreign patents, foreign patent applications and non-patent publications referred to in this specification and/or listed in the Application Data Sheet, including but not limited to U.S. patent application Ser. No. 15/892,259, filed Feb. 8, 2018, entitled "Object Tracking Using A Cognitive Heterogeneous Ad Hoc Mesh Network" and Provisional Patent Application No. 62/467,572, filed Mar. 6, 2017, entitled "Scatternet: A cognitive heterogeneous ad hoc mesh data/cellular/Wi-Fi network establishment/access points/connected devices through utilization of software applications exploiting existing technologies and frequency spectrum for data and voice communications through the exploitation of the Internet and Internet of Things, resulting in the creation of Data communications Adaptive RADAR (DATAR)," are incorporated herein by reference, in their entirety.

In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method, comprising:
   receiving, by a first participant from a second participant, a first notification signal that includes information regarding the second participant; and
   in response to determining that the first participant is to route communications to the second participant:
      updating, by the first participant based on the information in the first notification signal, a participant table to indicate that the first participant is to route communications to the second participant; and
      forwarding the updated participant table from the first participant to the second participant.

2. The method of claim 1, wherein updating the participant table further comprises:
   updating the participant table to include a forward flag that identifies the routing from the first participant to the second participant.

3. The method of claim 1, wherein updating the participant table further comprises:
   updating, by the first participant, the participant table to include information indicating at least two of: a position of the second participant, how the second participant is moving, which other participants are within line-of-sight of the second participant, and communication capabilities of the second participant.

4. The method of claim 1, further comprising:
   in response to determining that the first participant is to not route communications to the second participant, updating, by the first participant, the participant table to indicate that the first participant is to not route communications to the second participant.

5. The method of claim 1, further comprising:
   receiving, by the first participant, an additional update to the participant table from a ground participant; and
   in response to the participant table indicating that the first participant is to route communications to the second participant, forwarding, by the first participant to the second participant, the additional update to the participant table.

6. The method of claim 1, further comprising:
   receiving, by the first participant from the second participant, a request for data from a destination computing device;
   determining, by the first participant based on the participant table, a route having at least a next participant from the first participant to a ground participant that has access to the destination computing device based on an aggregated weighted value for pairs of participants at are in line-of-sight of each other along the route; and
   transmitting the data request to the next participant in the route.

7. The method of claim 1, further comprising:
   receiving, by the first participant, a request for data from a destination computing device;
   determining, by the first participant based on the participant table, a route from the first participant to the destination computing device based on a combination of weighted values for each pair of participants that are in line-of-sight of each other along the route; and
   transmitting the data request to a next participant in the route.

8. The method of claim 1, further comprising:
   receiving, by the first participant from a user device in communication with the first participant, a request for data from a destination computing device;
   determining, by the first participant, a next participant in route from the first participant to a ground participant in which to forward the request to the destination computing device based on the participant table; and
   transmitting the data request to the next participant.

9. The method of claim 1, further comprising:
   obtaining, by the first participant, a communication destined for a third participant;
   determining, by the first participant, a next participant in route from the first participant to the third participant in which to forward the communication based on the participant table; and transmitting the communication to the next participant in the route.

10. The method of claim 1, further comprising:
storing, by the first participant the participant table in a local memory on the first participant.

11. The method of claim 1, further comprising:
determining, by the first participant based on the participant table, a first route between the first participant and a third participant, wherein the second participant is a next participant from the first participant along the first route;
determining, by the first participant based on the participant table, a first aggregated value based on a first combination of communication values for each pair of participants between the first participant and the third participant along the first route;
determining, by the first participant based on the participant table, a second route between the first participant and the third participant that does not include the second participant;
determining, by the first participant based on the participant table, a second aggregated value based on a second combination of communication values for each pair of participants between the first participant and the third participant along the second route; and
in response to the first aggregated value exceeding the second aggregated value, determining, by the first participant, that the first participant is to route communications to the second participant.

12. The method of claim 1, further comprising:
receiving, by the first participant from a third participant, a second notification signal that includes second information regarding the third participant; and
in response to determining that the first participant is to route communications to the third participant:
updating, by the first participant based on the second information in the second notification signal, the participant table to indicate that the first participant is to route communications to the third participant; and
forwarding, by the first participant to the third participant, the updated participant table.

13. A system, comprising:
a plurality of participant computing devices, each respective participant computing device of the plurality of participant computer devices includes:
a memory that stores computer instructions and a local version of a participant table;
a transmitter that transmits line-of-sight notification signals to other participant computing devices of the plurality of participant computing devices;
a receiver that receives line-of-sight notification signals from other participant computing devices of the plurality of participant computing devices that are within line-of-sight communication of the respective participant computing device; and
a processor that is configured to execute computer instructions to:
receive, from a second participant computing device, a first notification signal that includes information regarding the second participant computing device; and
in response to determining that the respective participant computing device is to route communications to the second participant computing device:
update, based on the information in the first notification signal, the local version of the participant table to indicate that the respective participant computing device is to route communications to the second participant computing device; and
forwarding the updated participant table to the second participant computing device.

14. The system of claim 13, wherein the processor of each respective participant computing device is further configured to execute the computer instructions to:
receive a second updated participant table from another participant computing device; and
update the local version of the participant table based on the second updated participant table.

15. The system of claim 13, wherein the processor of each respective participant computing device is further configured to execute the computer instructions to:
receive an additional update to the participant table from a ground participant computing device; and
in response to the participant table indicating that the respective participant computing device is to route communications to the second participant computing device, forward, to the second participant computing device, the additional update to the participant table.

16. The system of claim 13, wherein the processor of each respective participant computing device is further configured to execute the computer instructions to:
determine, based on the participant table, a first route between the respective participant computing device and a third participant computing device, wherein the second participant computing device is a next participant from the respective participant along the first route;
determine, based on the participant table, a first aggregated value based on a first combination of communication values for each pair of participants between the respective participant computing device and the third participant computing device along the first route;
determine, based on the participant table, a second route between the respective participant computing device and the third participant computing device that does not include the second participant computing device;
determine, based on the participant table, a second aggregated value based on a second combination of communication values for each pair of participants between the respective participant computing device and the third participant computing device along the second route; and
in response to the first aggregated value exceeding the second aggregated value, determine that the respective participant computing device is to route communications to the second participant computing device.

17. The system of claim 13, wherein the processor of each respective participant computing device is further configured to execute the computer instructions to:
receive, from a third participant computing device, a second notification signal that includes second information regarding the third participant computing device; and
in response to determining that the respective participant computing device is to route communications to the third participant computing device:
update, based on the second information in the second notification signal, the participant table to indicate that the respective participant computing device is to route communications to the third participant computing device; and forward the updated participant table to the third participant computing device.

18. A participant computing device, comprising:
- a memory that stores computer instructions and a local version of a participant table;
- a transmitter that transmits line-of-sight notification signals to other participant computing devices;
- a receiver that receives line-of-sight notification signals from other participant computing devices; and
- a processor that, when executing the computer instructions, cause the participant computing device to:
  - receive, from a second participant computing device, a first notification signal that includes information regarding the second participant computing device; and
  - in response to determining that the participant computing device is to route communications to the second participant computing device:
    - update, based on the information in the first notification signal, the local version of the participant table to indicate that the participant computing device is to route communications to the second participant computing device; and
    - forwarding the updated participant table to the second participant computing device.

19. The participant computing device of claim 18, wherein the processor, when executing the computer instructions, further cause the participant computing device to:
- receive an additional update to the participant table from a third participant computing device; and
- in response to the participant table indicating that the respective participant computing device is to route communications to the second participant computing device, forward, to the second participant computing device, the additional update to the participant table.

20. The participant computing device of claim 18, wherein the processor, when executing the computer instructions, further cause the participant computing device to:
- receive, from a third participant computing device, a second notification signal that includes second information regarding the third participant computing device; and
- in response to determining that the respective participant computing device is to route communications to the third participant computing device:
  - update, based on the second information in the second notification signal, the participant table to indicate that the respective participant computing device is to route communications to the third participant computing device; and
  - forward the updated participant table to the third participant computing device.

* * * * *